(12) United States Patent
Kanaoka et al.

(10) Patent No.: US 7,887,969 B2
(45) Date of Patent: Feb. 15, 2011

(54) MEMBRANE-ELECTRODE ASSEMBLY FOR SOLID POLYMER ELECTROLYTE FUEL CELL

(75) Inventors: Nagayuki Kanaoka, Saitama (JP); Masaru Iguchi, Saitama (JP); Hiroshi Sohma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1251 days.

(21) Appl. No.: 11/485,509

(22) Filed: Jul. 13, 2006

(65) Prior Publication Data
US 2007/0015026 A1    Jan. 18, 2007

(30) Foreign Application Priority Data
Jul. 15, 2005    (JP)    ............. 2005-206279

(51) Int. Cl.
*H01M 8/10*    (2006.01)
(52) U.S. Cl. ............... 429/483; 429/479; 429/491; 429/493; 429/400; 521/27; 521/25; 427/115
(58) Field of Classification Search .......... 429/33, 429/30, 12, 483, 479, 491, 493, 400; 521/27, 521/25; 427/115
See application file for complete search history.

(56) References Cited

U.S. PATENT DOCUMENTS 7,288,603 B2 * 10/2007 Sakaguchi et al. ............ 429/33

FOREIGN PATENT DOCUMENTS

| JP | 07-220741 | | 8/1995 |
|---|---|---|---|
| JP | 2001-342241 | A | 12/2001 |
| JP | 2003-022708 | A | 1/2003 |
| JP | 2003-113136 | A | 4/2003 |
| JP | 2004-137444 | A | 5/2004 |
| JP | 2004-244517 | A | 9/2004 |
| JP | 2004-346164 | A | 9/2004 |
| JP | 2005-112985 | A | 4/2005 |
| JP | 2005-133081 | A | 5/2005 |
| JP | 2005-200441 | * | 7/2005 |
| JP | 2006-028414 | A | 2/2006 |
| JP | 2006-028415 | A | 2/2006 |
| WO | WO 02-38650 | * | 5/2002 |

OTHER PUBLICATIONS

Takeshi Kobayashi et al, "Preparation of Thermally Stable Proton Conducting Polymer (II)", 1993, pp. 2490-2492, vol. 42, No. 7, Polymer Preprints, Japan.

Takeshi Kobayashi et al, "Preparation of Thermally Stable Proton Conducting Polymer (V)", 1994, p. 736, vol. 43, No. 3, Polymer Preprints, Japan.

Takeshi Kobayashi et al, "Preparation of Thermally Stable Proton Conducting Polymer", 1993, p. 730, vol. 42, No. 3, Polymer Preprints, Japan.

* cited by examiner

*Primary Examiner*—Laura S Weiner
(74) *Attorney, Agent, or Firm*—Arent Fox LLP

(57) ABSTRACT

A membrane electrode assembly for solid polymer electrolyte fuel cells exhibits higher proton conductivity and superior thermal resistance, in which the solid polymer electrolyte membrane has a nitrogen atom and a sulfonic acid group, and a principal chain of a constitutional unit is a phenylene bond, is provided. In particular, the membrane electrode assembly for solid polymer electrolyte fuel cells preferably contains the sulfonated polyarylene expressed by the formula (1).

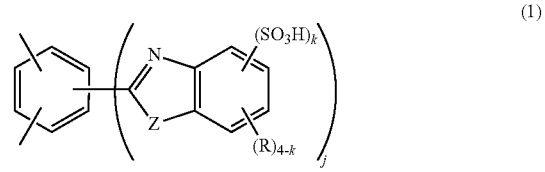

(1)

4 Claims, 4 Drawing Sheets

US 7,887,969 B2

MEMBRANE-ELECTRODE ASSEMBLY FOR SOLID POLYMER ELECTROLYTE FUEL CELL

This application is based on and claims the benefit of priority from Japanese Patent Application No. 2005-206279, filed on 15 Jul. 2005, the content of which is incorporated herein by reference.

BACKGROUND OF THE INVENTION

1. Field of the Invention

The present invention relates to a membrane electrode assembly for solid polymer electrolyte fuel cells. More specifically, it is related to a membrane electrode assembly for solid polymer electrolyte fuel cells which are available for an electrolyte for a primary cell, an electrolyte for a secondary cell, a high polymer solid electrolyte for a fuel cell, a display device, a variety of sensors, a signal transfer medium, a solid condenser, and an ion exchange membrane, and the like.

2. Related Art

A fuel cell is a clean, environment friendly power generating system with high electrical efficiency, and which has been attracting a great deal of attention as earth environmental protection and break away from dependence on fossil fuels in recent years. It is desired that a fuel cell is mounted in a small distribution power generating facility, a power generating device as a driving force of a movable body, such as a vehicle or vessel. Furthermore, the fuel cell is desired to replace a second battery such as a lithium ion battery that mounted in a mobile phone, a mobile personal computer, or the like.

A polymer electrolyte fuel cell provides a pair of electrodes on the opposite sides of a solid polymer electrolyte membrane with proton conductivity, supplies pure hydrogen or reformed hydrogen gas as fuels to one electrode (a fuel electrode) and oxygen gas or air as oxidants to the other electrode, so as to obtain electromotance. In addition, water electrolysis is the reverse action of fuel reaction, which produces hydrogen and oxygen by using the solid polymer electrolyte membrane.

However, in an actual fuel cell or water electrolysis, a secondary reaction other than a primary reaction occurs. The representative example is hydrogen peroxide ($H_2O_2$) generated by which radical species cause the deterioration of the solid polymer electrolyte membrane.

Conventionally, a perfluorosulfonic acid membrane, such as Nafion (registered trademark) produced by du Pont Kabushiki Kaisha, Aciplex (registered trademark), produced by Asahi Kasei Corporation, or Flemion (registered trademark) produced in Asahi Glass Co., Ltd. Corporation, is used as a solid polymer electrolyte membrane.

However, the problem with perfluorosulfonic acid membranes, such as Nafion, is that they are very difficult to produce, and therefore can be extremely expensive, which is a large barrier regarding public welfare need to be overcome in order for a fuel cell electric vehicle to become widespread. In addition, perfluorosulfonic acid membranes have a large number of fluorine atoms in the molecule, so that an additional problem exists regarding disposal processing which increases pressure on the environment.

Furthermore, the higher the temperature and the thinner the membrane thickness of the proton conductive membrane which is between the electrodes a fuel cell has, the lower the membrane resistance and the higher power generating output it has. However, the heat distortion temperature of these perfluorosulfonic acid membranes is around 80 to 100 degrees C., which means the high temperature creep resistance is extremely low at high temperature. Therefore, there are problems with limitations in power generating performance, because the power generating temperature must be maintained at below 80 degrees C. In addition, the membrane thickness is unstable when the membrane is used for a long period, so that some membrane thickness (more than 50 μm) is required to prevent short circulation between electrodes; and therefore, it is difficult to thin the proton conductive membrane.

In order to solve these problems with respect to perfluorosulfonic acid membranes, a variety of solid polymer electrolyte membranes having a heat resistant main chain skeleton, which is low cast for being applied to engineer plastics, has been researched recently. Polymers, in which the main chain aromatic ring of a polyarylene system, polyetheretherketone system, polyethersulfone system, polyphenylene sulfide system, polyimide system, or polybenzazol system is sulfonated, have been proposed (see Non-patent Documents 1 to 3).

Non-patent Document 1: Polymer Preprints, Japan, Vol. 42, No. 7, pp. 2490-2492 (1993)

Non-patent Document 2: Polymer Preprints, Japan, Vol. 43, No. 3, p. 736 (1994)

Non-patent Document 3: Polymer Preprints, Japan, Vol. 42, No. 3, p. 730 (1993)

However, in these polymers in which the main chain aromatic rings exhibit higher water absorption, but lower hot water resistance, the number of hydrophilic groups such as sulfonic acid groups is limited. In addition, the polymers exhibit inferior radical resistance in terms of Fenton reagent resistance (hydroxyl radical resistance characteristics), which determines the power resistance. Furthermore, when these electrolyte membranes are exposed to high temperatures, more than 100 degrees C. for a long period of time, there is a problem in that the sulfonic acid detaches to lower the proton conductivity, or causes a crosslinking reaction with another aromatic ring in which no sulfonic acid group has been introduced, thereby becoming brittle. Once the embrittlement of the membrane progresses, a rupture (pinhole) in the membrane occurs, resulting in a possible shutdown of power generation.

An object of the present invention is to solve problems with respect to a fluorine system electrolyte membrane and an aromatic system electrolyte membrane, improve the hot water resistance of the membranes, provide the solid polymer electrolyte with superior proton conductivity, and a membrane electrode assembly for solid polymer electrolyte fuel cells including the solid polymer electrolyte.

SUMMARY OF THE INVENTION

As a result of extensive research to achieve the objects, the inventors have found that a solid polymer electrolyte membrane-electrode assembly (hereinafter sometimes referred to as "MEA") consisting of the solid electrolyte including repeating units having a nitrogen atom and a sulfonic acid group, in which a principal chain forms a phenylene bond, is effective. Particularly, the solid electrolyte with a sulfonated polyarylene having an azole group exhibits superior hot water resistance and higher proton conductivity to obtain an MEA that satisfies the object of the present invention. Specifically, the present invention provides the membrane electrode assembly for solid polymer electrolyte fuel cells as described below.

According to a first aspect of the present invention, a membrane electrode assembly for solid polymer electrolyte fuel cells includes: an anode electrode; a cathode electrode; and a solid polymer electrolyte membrane, the anode electrode and the cathode electrode being disposed on opposite sides of the solid polymer electrolyte membrane, in which the solid polymer electrolyte membrane has a nitrogen atom and a sulfonic acid group, and the constitutional unit in which the principal chain forms a phenylene bond.

According to a second aspect of the present invention, in the membrane electrode assembly for solid polymer electrolyte fuel cells as described in the first aspect of the present invention, the solid polymer electrolyte membrane includes a sulfonated polyarylene having a constitutional unit expressed by the general formula (1) shown below.

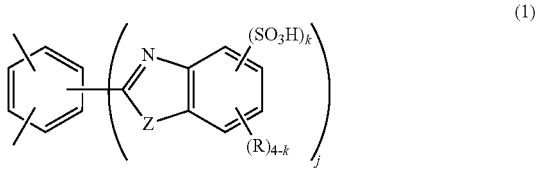

In the general formula (1), Z represents a sulfur atom, oxygen atom, and —NH— group; R, represents at least one atom or group selected from a hydrogen atom, fluorine atom, alkyl group, partly or fully halogenated alkyl group, allyl group, aryl group, nitro group and nitrile group, which may be identical or different from each other; and j and k are integers of 1 to 4.

According to a third aspect of the present invention, in the membrane electrode assembly for solid polymer electrolyte fuel cells as described in the second aspect described of the present invention, the solid polymer electrolyte membrane includes a sulfonated polyarylene having a constitutional unit expressed by the general formula (1) shown below.

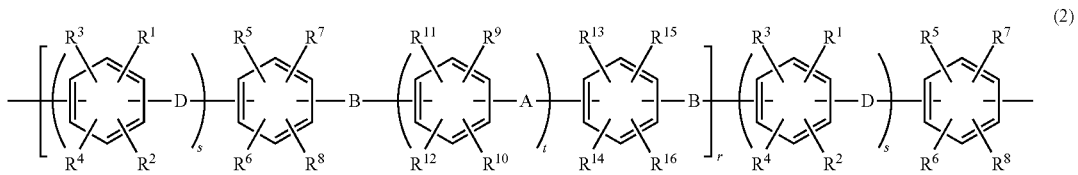

In the general formula (2), A and D each independently represent at least one structure, independently selected from the group consisting of: a direct bond, —CO—, —SO$_2$—, —SO—, —CONH—, —COO—, —(CF$_2$)$_l$— (l is an integer of 1 to 10), —(CH$_2$)$_l$— (l is an integer of 1 to 10), —CR'$_2$— (R' is an aliphatic hydrocarbon group, aromatic hydrocarbon group, or halogenated hydrocarbon group) cyclohexylidene group, fluorenylidene group, —O—, or —S—; B is independently selected from an oxygen or sulfur atom; $R^1$ to $R^{16}$, which may be identical or different from each other, represents at least one atom or group selected from: a hydrogen atom, fluorine atom, alkyl group, partly or fully halogenated alkyl group, allyl group, aryl group, nitro group and nitrile group; s and t are integers of 0 to 4; and r is an integer of 0 or more than 1.

According to a fourth aspect of the present invention, in the membrane electrode assembly for solid polymer electrolyte fuel cells as described in the second aspect or the third aspect of the present invention, the sulfonated polyarylene contains 0.5 to 99.999 mol % of the constitutional unit expressed by the general formula (1), and 0.001 to 90 mol % of the constitutional unit expressed by the general formula (2).

According to a fifth aspect of the present invention, in the membrane electrode assembly for solid polymer electrolyte fuel cells as described in the second aspect or the third aspect of the present invention, the ion exchange capacity of the sulfonated polyarylene is 0.5 to 3 meq/g.

According to a sixth aspect of the present invention, in the membrane electrode assembly for solid polymer electrolyte fuel cells as described in the second aspect or the third aspect of the present invention, the sulfonated polyarylene has a molecular weight of 10,000 to 1,000,000.

The present invention provides a membrane electrode assembly for solid polymer electrolyte fuel cells as an MEA consisting of the solid polymer electrolyte membrane with a nitrogen atom and sulfonic acid group, in which a principal chain forms a phenylene bond, so as to exhibit higher heat resistance and superior proton conductivity.

DETAILED DESCRIPTION OF THE INVENTION

Figure 1:
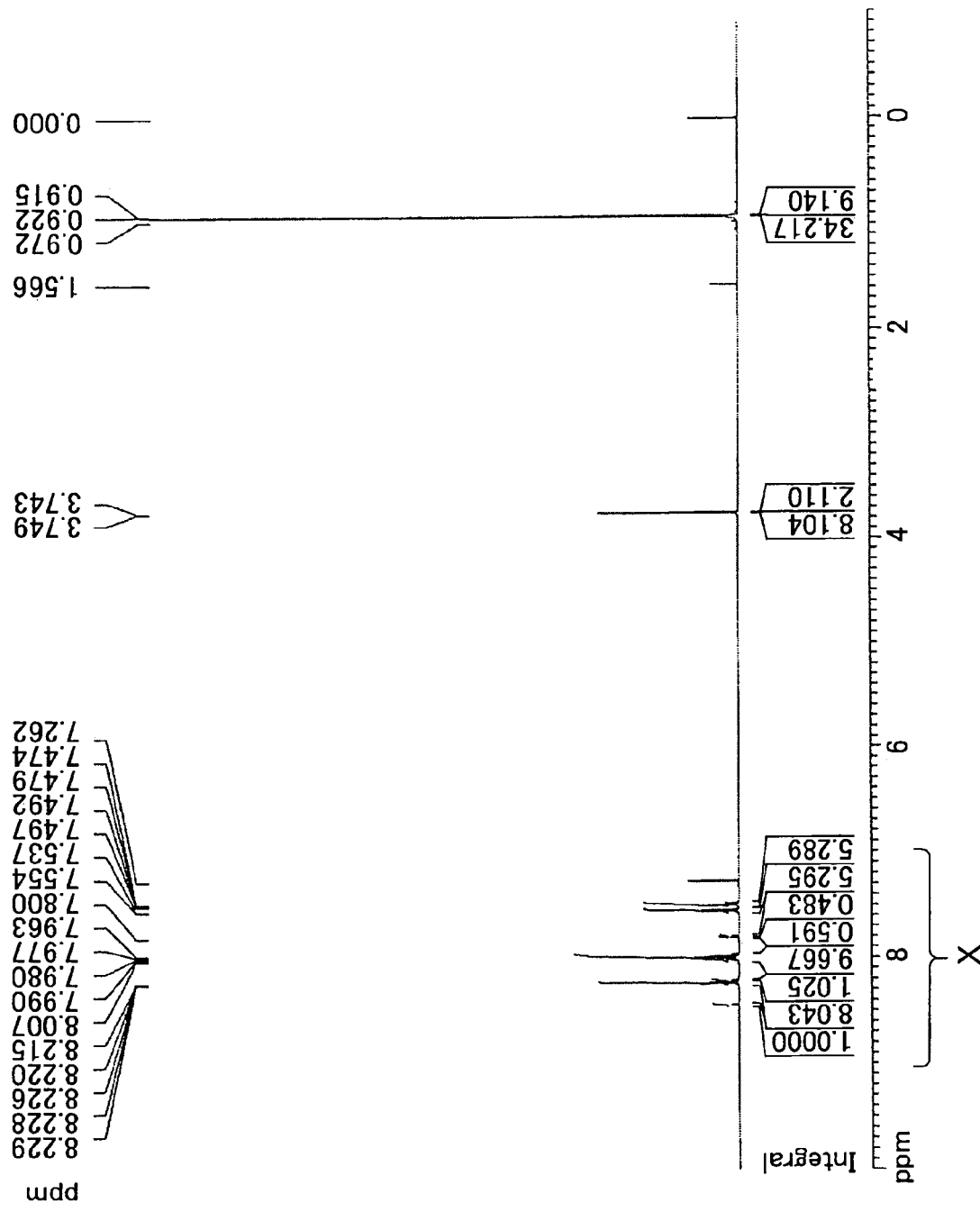
FIG. 1 shows $^1$H-NMR spectra of sulfonic acid unit expressed by the formula (8-1) obtained in Example 1.

An MEA according to the present invention will be explained in more detail below. In the present invention, a solid polymer electrolyte membrane (proton conductive membrane), from which an MEA is constituted, includes constitutional repeating units having a nitrogen atom and a sulfonic acid group, in which the principal chain forms a phenylene bond. Preferably, a nitrogen atom is included in the form of an azole group, and a sulfonic acid group is bonded to a branched chain. Examples of azole groups include an oxazole group, thiazole group, and imidazole, and among these, preferably an oxazole group.

Sulfonated Polyarylene

Sulfonated polyarylene used for the present invention includes a repeating unit expressed by the general formula (1) shown below.

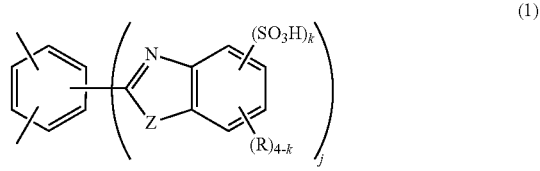

In the general formula (1), Z represents a sulfur atom, oxygen atom, and —NH— group, among which an oxygen atom or sulfur atom is preferred, and more preferably an oxygen atom.

R represents at least one atom or group selected from: a hydrogen atom, fluorine atom, alkyl group, partly or fully halogenated alkyl group, allyl group, aryl group, nitro group and nitrile group, which may be identical or different from each other, and which is preferably a hydrogen atom or fluorine atom.

Examples of the alkyl groups include methyl, ethyl, propyl, butyl, amyl, hexyl, cyclohexyl and octyl groups. Examples of the halogenated alkyl groups include trifluoromethyl, pentafluoroethyl, perfluoropropyl, perfluorobutyl, perfluoropentyl and perfluorohexyl groups. An example of the allyl group includes a propenyl group; and examples of the aryl groups include phenyl and pentafluorophenyl groups.

j and k are integers of 1 to 4, in which j is preferably 1 or 2, and k is preferably 1 or 2.

The sulfonated polyarylene used for the present invention may be copolymerized with components other than the constitutional unit expressed by the general formula (1). A copolymerized component is preferably a constitutional unit expressed by the formula (2) shown below.

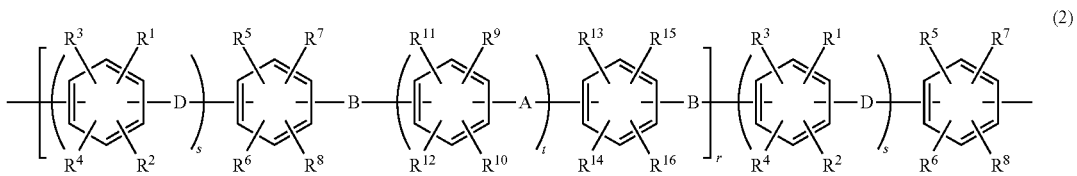

(2)

In the formula (2), A and D are each represent a structure, selected independently from the group consisting of a direct bond, —CO—, —SO$_2$—, —SO—, —CONH—, —COO—, —(CF$_2$)$_l$— (l is an integer of 1 to 10), —(CH$_2$)$_l$— (l is an integer of 1 to 10), —CR'$_2$— (R' is an aliphatic hydrocarbon group, aromatic hydrocarbon group, or halogenated hydrocarbon group) cyclohexylidene group, fluorenylidene group, —O—, or —S—. Examples of structures expressed by —CR'$_2$— include a methyl group, ethyl group, propyl group, isopropyl group, butyl group, isobutyl group, t-butyl group, propyl group, octyl group, decyl group, octadecyl group, phenyl group, and trifluoromethyl group.

Among these, a direct bond, —CO—, —SO$_2$—, or —CR'$_2$— (R' is an aliphatic hydrocarbon group, aromatic hydrocarbon group, or halogenated hydrocarbon group), cyclohexylidene group, fluorenylidene group, or —O— is preferable.

B represents independently an oxygen or sulfur atom.

$R^1$ to $R^{16}$, which may be identical or different from each other, represent at least one atom or group selected from: a hydrogen atom, fluorine atom, alkyl group, partly or fully halogenated alkyl group, allyl group, aryl group, nitro group and nitrile group.

Examples of the alkyl groups include methyl, ethyl, propyl, butyl, amyl, hexyl, cyclohexyl and octyl groups. Examples of the halogenated alkyl groups include trifluoromethyl, pentafluoroethyl, perfluoropropyl, perfluorobutyl, perfluoropentyl and perfluorohexyl groups. An example of the allyl group includes a propenyl group; and examples of the aryl groups include phenyl and pentafluorophenyl groups.

s and t are integers of 0 to 4. r is an integer of 0 or more than 1, with the upper limit usually being 100, and preferably 1 to 80.

Preferable combinations with respect to the values of s and t and the structures of A, B, D and $R^1$ to $R^{16}$ are as follows:

(1) s=1 and t=1, A is —CR'$_2$— (R' is an aliphatic hydrocarbon group, aromatic hydrocarbon group, or halogenated hydrocarbon group), cyclohexylidene group, or fluorenylidene group, B is an oxygen atom, D is a —CO— or —SO$_2$—, $R^1$ to $R^{16}$ is a hydrogen atom or fluorine atom;

(2) s=1, t=0; B is oxygen atom; D is —CO— or —SO$_2$—; $R^1$ to $R^{16}$ are hydrogen or fluorine atoms; or (3) s=0, t=1, A is —CR'$_2$— (R' is an aliphatic hydrocarbon group, aromatic hydrocarbon group, or halogenated hydrocarbon group), cyclohexylidene group, or fluorenylidene group, B is an oxygen atom, and $R^1$ to $R^{16}$ is a hydrogen atom, fluorine atom, or nitrile group.

A sulfonated polyarylene having the general formulas (1) and (2) is expressed by the general formula (6) shown below.

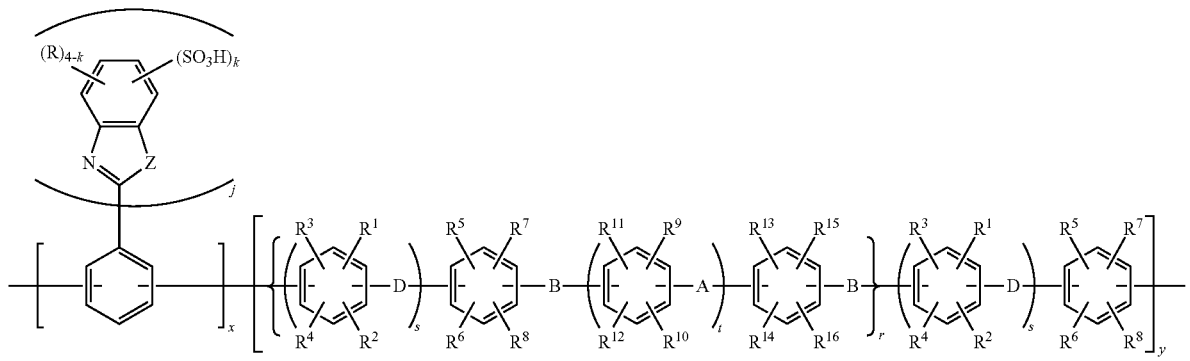

(6)

In the general formula (6), the meanings of A, B, D, R, Z, j, k, m, r, s, t and $R^1$ to $R^{16}$ are the same as those of A, B, D, R, Z, j, k, m, r, s, t and $R^1$ to $R^{16}$ in the general formulas (1) and (2). x and y represent a mole ratio in which x+Y=100 mole %.

Preferably, the sulfonated polyarylene according to the present invention contains 0.5 to 99.999 mol % of the constitutional unit as expressed by the general formula (1), i.e., the unit x, and 0.001 to 90 mole % as expressed by the general formula (2), i.e., the unit y.

Method for Producing Sulfonated Polyarylene

Aromatic Compounds

Aromatic compounds used for producing the sulfonated polyarylene expressed by the general formula (1) are expressed by the general formula (3) shown below.

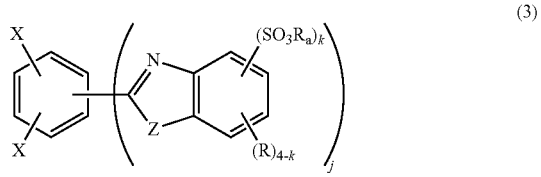

(3)

X represents an atom or group selected from halogen atoms other than fluorine, i.e., a chlorine, a bromine or iodine atom, —$OSO_2CH3$, or —$OSO_2CF3$. Rb represents an alkyl group, fluorination alkyl group or aryl group; specifically, a methyl group, ethyl group, trifluoromethyl group, and phenyl group.

Z represents a sulfur atom, oxygen atom, or —NH— group, and among these, preferably an oxygen atom.

R represents at least one atom or group selected from: a hydrogen atom, fluorine atom, alkyl group, partly or fully halogenated alkyl group, allyl group, aryl group, nitro group and nitrile group, which may be identical or different from each other.

Examples of the alkyl groups include methyl, ethyl, propyl, butyl, amyl, hexyl, cyclohexyl and octyl groups. Examples of the halogenated alkyl groups include trifluoromethyl, pentafluoroethyl, perfluoropropyl, perfluorobutyl, perfluoropentyl and perfluorohexyl groups. An example of the allyl group includes a propenyl group; and examples of the aryl groups include phenyl and pentafluorophenyl groups. Among these, R is preferably a hydrogen atom, or fluorine atom.

Ra represents a hydrocarbon group with 1 to 20 carbon atoms, preferably 4 to 20 carbon atoms. The hydrocarbon group having carbon atoms of 1 to 20 may be a linear hydrocarbon group, branched hydrocarbon group, alicyclic hydrocarbon group, or hydrocarbon group with a five-membered heterocyclic ring, such as methyl, ethyl, n-propyl, iso-propyl, tert-butyl, iso-butyl, n-butyl, sec-butyl, neopentyl, cyclopentyl, hexyl, cyclohexyl, cyclopentylmethyl, cyclohexylmethyl, adamanthyl, adamantanemethyl, 2-ethylhexyl, bicyclo[2.2.1]heptyl, bicyclo[2.2.1]heptylmethyl, tetrahydrofurfuryl, 2-methylbutyl, 3,3-dimethyl-2,4-dioxolanemethyl, cyclohexylmethyl, adamanthylmethyl or bicyclo[2.2.1]heptylmethyl group. Preferably, the hydrocarbon group is n-butyl, neopentyl, tetrahydrofurfuryl, cyclopentyl, cyclohexyl, cyclohexylmethyl, adamanthylmethyl or bicyclo[2.2.1]heptylmethyl group, and in particular neopentyl group is preferable.

j and k are integers of 1 to 4. Preferably, j is 1 or 2, and more preferably 1, and k is 1 or 2.

Examples of the aromatic compounds expressed by the formula (3) include the following structures shown below.

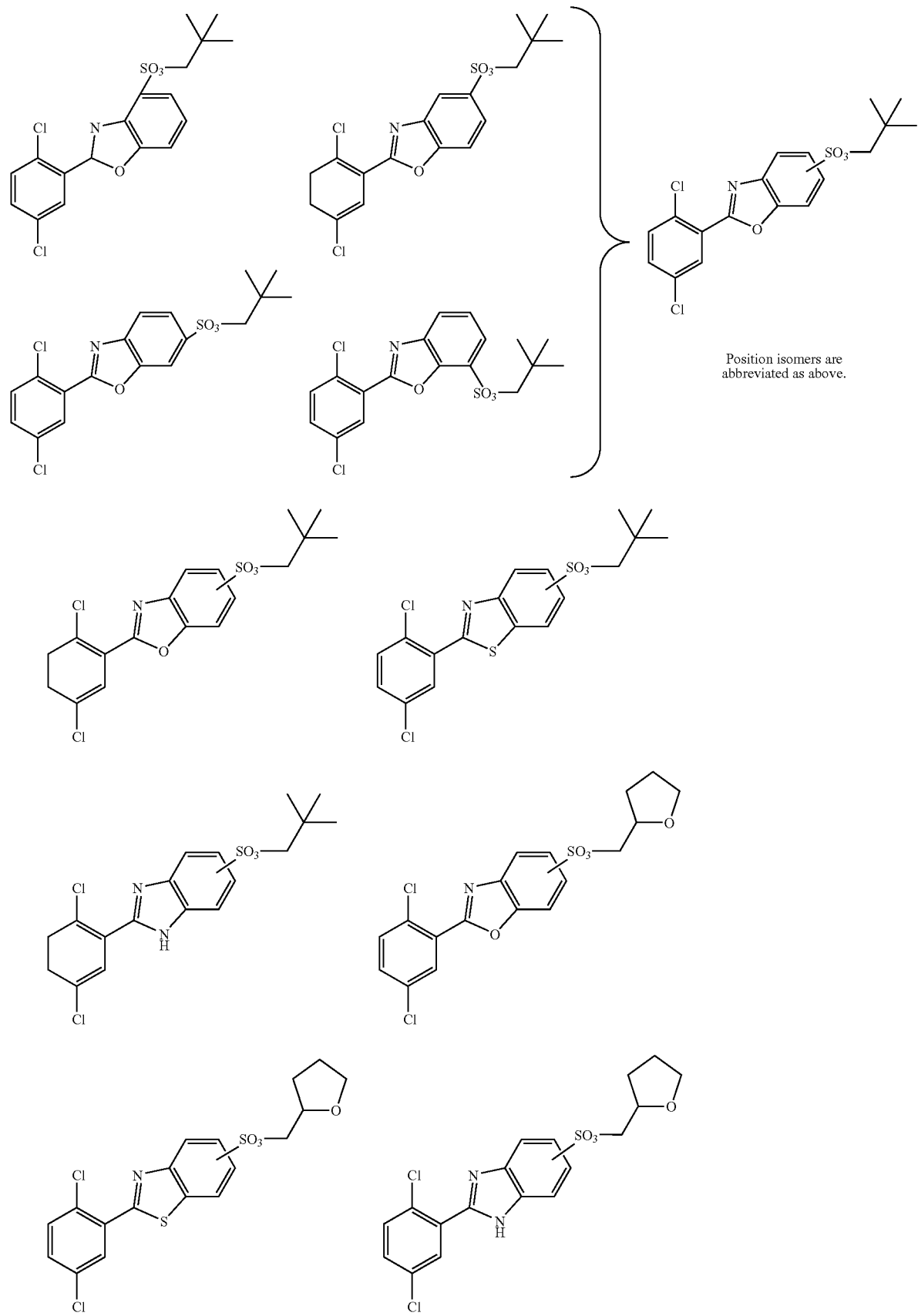
Position isomers are abbreviated as above.

-continued
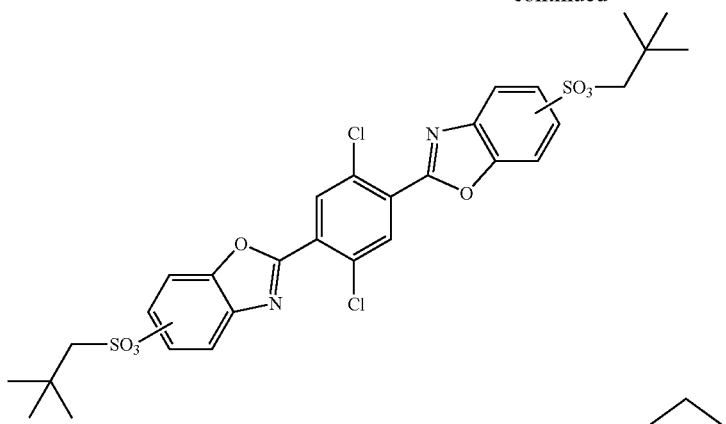
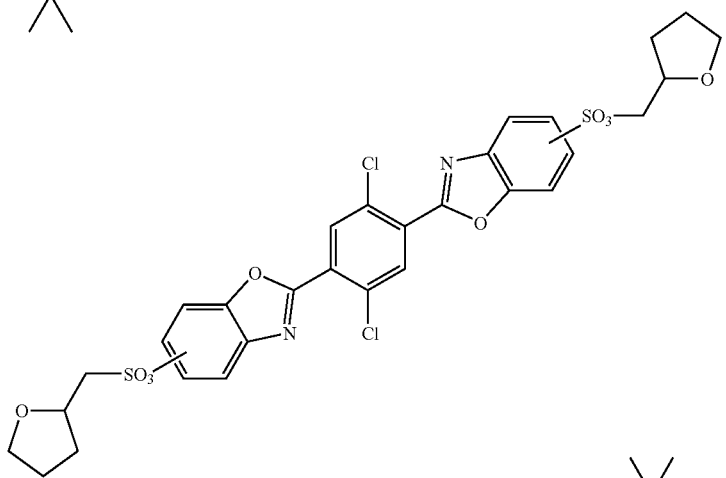
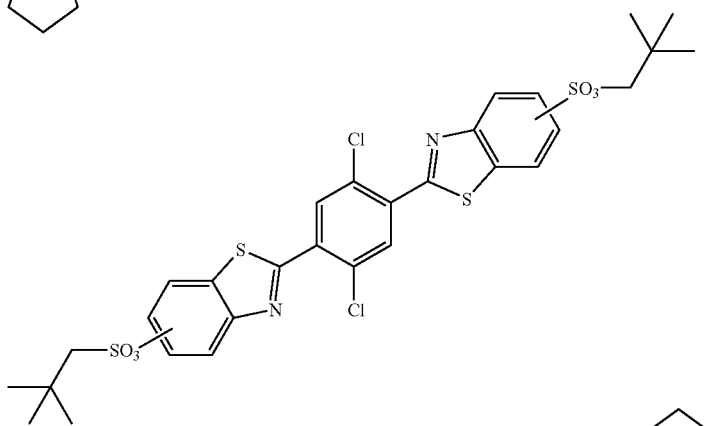
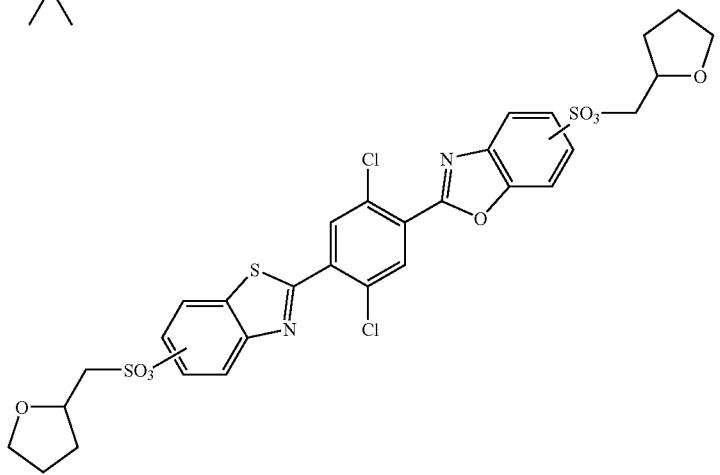

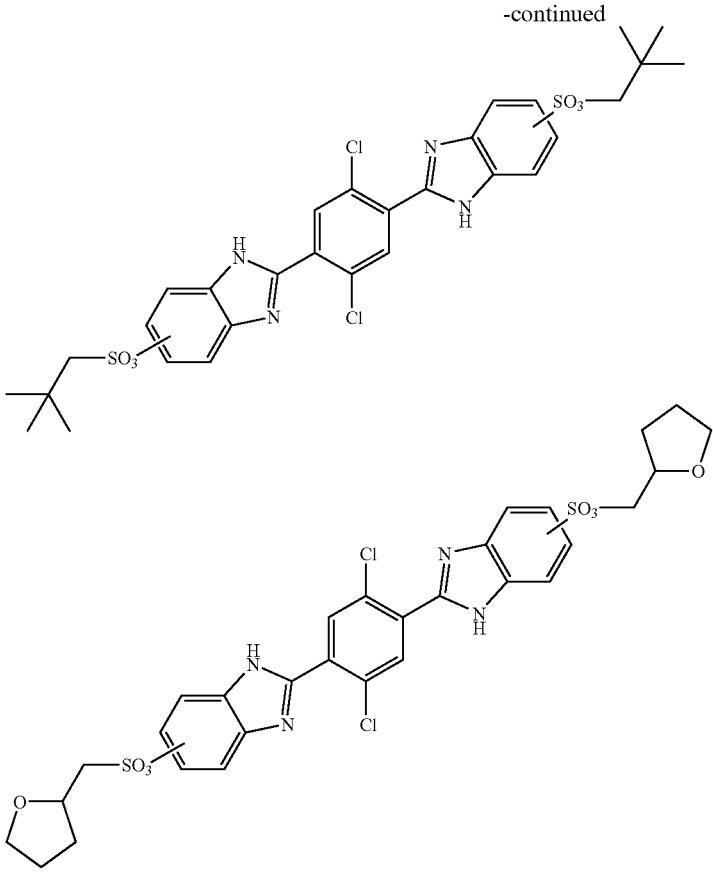

In addition, according to the present invention the aromatic compounds include compounds in which a chlorine atom from the abovementioned compounds is substituted with a bromine atom. Furthermore, isomers having a chlorine atom or bromine atom with various bonding positions may be included.

In order to allow polymerization to proceed stably and prevent polymerization inhibition or crosslinking due to sulfonic acid formed by de-esterification, it is preferred that Ra in the general formula (3) be derived from a primary alcohol which includes a tertiary or quaternary carbon, and more preferably a quaternary carbon at its beta-position.

The aromatic compound used for the present invention may be a single compound, or a mixture of plural positional isomers.

Method for Manufacturing Aromatic Compound

The compound expressed by the formula (3) shown above may be synthesized via the reaction described below.

First, the carboxylic acid expressed by the general formula (4) and the compound expressed by the general formula (5) are dehydrated to obtain a compound with an azole group.

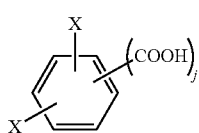

(4)

In the general formula (4) shown above, X represents an atom or group selected from halogen atoms other than fluorine, —OSO$_2$CH3, or —OSO$_2$CF3. j is an integer of 1 to 4. Preferably, j is 1 or 2, and more preferably 1.

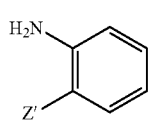

(5)

In the general formula (5), Z' represents an OH group, SH group, NH$_2$ group, preferably an OH group.

Examples of compounds expressed by the general formula (4) include 2,4-dichlorobenzoic acid, 2,5-dichlorobenzoic acid, 2,6-dichlorobenzoic acid, 2,5-dichloroterephthalic acid, 2,6-dichloroterephthalic acid, and 2,4-dichloroisophthalic acid. Compounds in which a chlorine atom is substituted with a bromine atom or iodine atom are also included, among which 2,5-dichlorobenzoic acid, 2,4-dichlorobenzoic acid, 2,5-dichloroterephthalic acid are preferred, and more preferably 2,5-dichlorobenzoic acid.

In addition, examples of compounds expressed by the general formula (5) include 2-aminophenol, 2-aminothiophenol, and 1,2-diaminobenzene, among which, 2-aminophenol, or 2-aminothiophenol is preferred, and more preferably 2-aminophenol.

It is preferred that a catalyst for promoting dehydration be used in the reaction, for example, phosphorus pentoxide/methane sulfonic acid. The reaction temperature is usually 0 to 400 degrees C.

Second, the aromatic compound having an azole group, which is obtained by the abovementioned reaction, is sulfonated. Examples of a sulfonating agent include a sulfuric acid, chlorosulfonic acid, fuming sulfuric acid, sulfuric anhydride, and the like. Reactivity, reaction temperature, and reaction period of suffocating agent are controlled so as to introduce a sulfonic acid group into the intended aromatic ring. The preferred sulfonating agent is chlorosulfonic acid. It is preferred that the reaction temperature be 80-130 degrees C. when chlorosulfonic acid is used.

Third, the obtained sulfonic acid is converted to acid chloride. Thionyl chloride, phosphorus oxychloride, phosphorous pentachloride or the like can be used to this reaction. In addition, when chlorosulfonic acid is used as a sulfonating agent, the sulfonic acid can be isolated in the form of acid chloride, so that this step can be omitted.

Finally, various kinds of alcohols are esterified to obtain the aromatic compound of the present invention. Examples of the alcohols include a linear hydrocarbon group, branched hydrocarbon group, alicyclic hydrocarbon, and the like, such as a t-butyl alcohol, sec-butyl alcohol, isobutanol, n-butyl alcohol, n-pentanol, neopentyl alcohol, cyclopentyl alcohol, n-hexyl alcohol, cyclohexyl alcohol, heptyl alcohol, octyl alcohol, 2-ethylhexyl alcohol, cyclopentylcarbinol, adamanthylethyl alcohol, cyclohexylcarbinol, adamanthycarbinol, tetrahydrofurfuryl alcohol, 2-methylbutyl alcohol, 3,3-dimethyl-2,4-dioxolanecarbinol, bicyclo[2.2.1]heptyl alcohol, bicyclo[2.2.1]heptylmethyl alcohol, and the like. Among these, neopentyl alcohol, tetrahydrofurfuryl alcohol, cyclopentylmethyl alcohol, cyclohexylmethyl alcohol, adamanthylmethyl alcohol, and bicyclo[2.2.1]heptylmethyl alcohol are preferred, and more preferably neopentyl alcohol.

Preferably, bases such as pyridine, triethylamine, tripropylamine, and trioctylamine are added when the esterification.

Method for Producing Sulfonated Polyarylene

The polyarylene having the sulfonic acid expressed by the general formula (6) may be produced, for example, by Method A, Method B, or Method C described below.

Method A

A monomer, which is an aromatic compound expressed by the general formula (3), and a monomer or oligomer capable of constituting a repeating unit expressed by the general formula (2), are copolymerized, for example, in accordance with the method described in Japanese Unexamined Patent Application Laid-Open No. 2004-137444, and a polyarylene is thereby prepared having a sulfonic ester group. The sulfonic ester group is then de-esterified to be converted into a sulfonic acid group, and thereby a polyarylene having the sulfonic acid group can be synthesized.

Method B

A monomer having a skeleton expressed by the general formula (3) and having neither the sulfonic acid group nor the sulfonic ester group, and a monomer or oligomer capable of forming the constitutional unit expressed by the general formula (2) are copolymerized, for example, in accordance with the method described in Japanese Unexamined Patent Application Laid-Open No. 2001-342241. The resulting polymer is then sulfonated by use of a sulfonating agent, and thereby a polyarylene having the sulfonic acid group can be synthesized.

Preferably, the sulfonated polyarylene according to the present invention is produced by Method A.

In cases in which r=0, specific examples of the monomers and oligomers, which are capable of forming the constitutional unit expressed by the general formula (2), and used in Method A or B, include: 4,4'-dichlorobenzophenone, 4,4'-dichlorobenzanilide, 2,2-bis(4-chlorophenyl)difluoromethane, 2,2-bis(4-chlorophenyl)-1,1,1,3,3,3-hexafluoropropane, 4-chlorobenzoic acid-4-chlorophenylester, bis(4-chlorophenyl)sulfoxide, bis(4-chlorophenyl)sulfone, and 2,6-dichlorobenzonitrile. The abovementioned compounds, in which the chlorine atom is replaced by bromine or iodine atom, may be used.

In cases in which r=1, the compounds, for example, described in Japanese Unexamined Patent Application Laid-Open No. 2003-113136 may be used.

In cases in which r is more than 2, the compounds described in Japanese Unexamined Patent Laid-Open Nos. 2004-137444, 2004-244517, 2004-346164, and 2005-112985, and Japanese Patent Application Nos. 2003-348524, 2004-211739, 2004-211740 are included.

In Method B, a monomer is expressed by the general formula (7) which has a skeleton as expressed by the general formula (3), but which lacks the sulfonic acid group and sulfonic ester group, may be used.

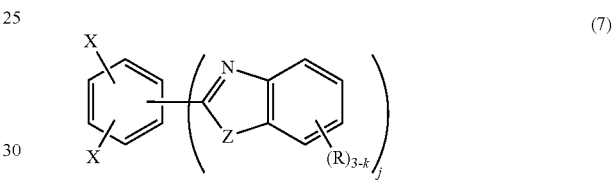

In the formula (7), the meanings of j, k, Z, R, X are the same as those defined in the general formula (3).

A specified example of the monomers expressed by the general formula (7) includes the following structures shown below.

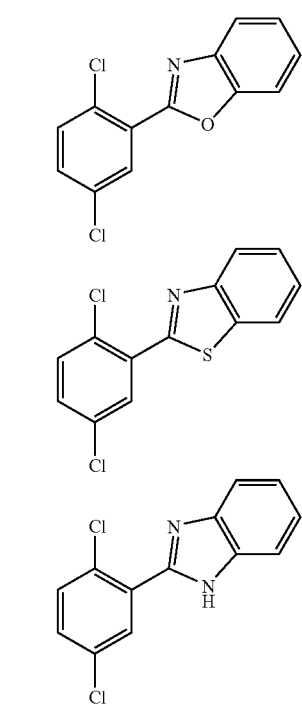

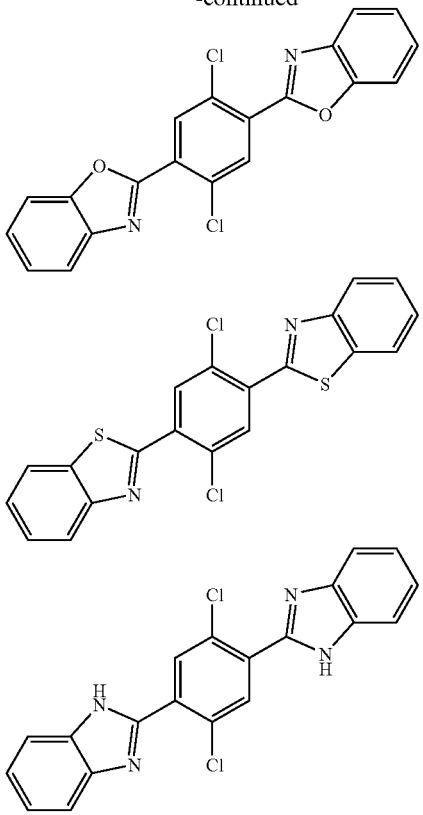

The abovementioned compounds include compounds in which a chlorine atom of the abovementioned compounds is substituted with a bromine atom. Furthermore, isomers having a chlorine atom or bromine atom with various bonding positions are included.

In order to prepare the polyarylene having a sulfonic acid group, it is necessary that a monomer which is capable of forming the constitutional unit expressed by the general formula (3), and a monomer or oligomer that is capable of forming the constitutional unit expressed by the general formula (2), be copolymerized to prepare a precursor polyarylene in Method A. It is necessary that a monomer that is capable of forming the constitutional unit expressed by the general formula (7), and a monomer or oligomer that is capable of forming the constitutional unit expressed by the general formula (2), be copolymerized to prepare a precursor polyarylene in Method B. The copolymerization is achieved by use of a catalyst. The available catalyst contains a transition metal compound. The catalyst essentially contains: (i) a transition metal salt and a ligand compound (hereinafter sometimes referred to as "ligand component"), or a transition metal complex with a coordinate ligand (including copper salt); and (ii) a reducing agent, and additionally an optional "salt", in order to increase the polymerization reaction rate.

The specific examples of the catalyst components, the usage ratio of each component, solvents, concentration, temperature, time period and the like in the reaction are illustrated in Japanese Unexamined Patent Application Laid-Open No. 2001-342241.

The polyarylene having the sulfonic acid group may be prepared by converting a polyarylene, as a precursor, into the corresponding polyarylene having the sulfonic acid group.

Methods such as these may be exemplified in the following two ways, which are described below.

Method A

The precursor polyarylene having the sulfonic ester group is de-esterified in accordance with the method described in Japanese Unexamined Patent Application Laid-Open No. 2004-137444.

Method B

The precursor polyarylene is sulfonated in accordance with the method described in Japanese Unexamined Patent Application Laid-Open No. 2001-342241.

The ion-exchange capacity of the polyarylenes having the sulfonic acid group expressed by the general formula (6) prepared in accordance with the methods described above is usually 0.3 to 5 meq/g, preferably 0.5 to 3 meq/g, and more preferably 0.8 to 2.8 meq/g. However, when the ion-exchange capacity is less than 0.3 meq/g, the power generating performance is insufficient due to lower proton conductivity. On the other hand, when it is more than 5 meq/g, the water resistance may be remarkably degraded, so that it is not preferred.

The ion-exchange capacity may be controlled, for example, by selecting the type, the usage ratio and the combination of the precursor monomer expressed by the general formula (3) or (7), and the monomer or oligomer capable of constituting the repeating unit expressed by the general formula (2).

The molecular weight of the resulting polyarylene having the sulfonic acid group is 10,000 to 1,000,000, and is preferably 20,000 to 800,000, as the average molecular weight based on polystyrene standard by way of gel permeation chromatography (GPC).

The sulfonated polyarylene may contain an antioxidant, preferably a hindered phenol compound having a molecular weight of no less than 500; and such an antioxidant may enhance the durability with respect to an electrolyte.

Hindered phenol system compounds according to the present invention include:

Triethyleneglycol-bis[3-(3-t-butyl-5-carbinyl-4-hydroxyphenyl)propionate] (product name: IRGANOX245), 1,6-hexanediol-bis[3-(3,5-di-t-butyl-4-hydroxyphenyl)propionate] (product name: IRGANOX259), 2,4-bis-(n-octylthio)-6-(4-hydroxy-3,5-di-t-butylanilino)-3,5-triazine (product name: IRGANOX565), Pentaerylthrityl-tetrakis[3-(3,5-di-t-butyl-4-hydroxyphenyl)propionate] (product name: IRGANOX1010), 2,2-thio-diethylenebis[3-(3,5-di-t-butyl-4-hydroxyphenyl)propionate] (product name: IRGANOX1035), Octadecyl-3-(3,5-di-t-butyl-4-hydroxyphenyl)propionate) (product name: IRGANOX1076), N,N-hexamethylenebis(3,5-di-t-butyl-4-hydroxy-hydrocinamid) (product name: IRGANOX1098), 1,3,5-trimethyl-2,4,6-tris(3,5-di-t-butyl-4-hydroxybenzyl)benzene (product name: IRGANOX1330), tris-(3,5-di-t-butyl-4-hydroxybenzyl)-isocyanurate (product name: IRGANOX3114), and 3,9-bis[2-[3-(3-t-butyl-4-hydroxy-5-methylphenyl)propionyloxy]-1,1-dimethylethyl]-2,4,8,10-tetraoxaspiro[5.5]undecane (product name: Sumilizer GA-80).

Preferably, the hindered phenol compound is used in an amount of 0.01 to 10 weight parts based on 100 weight parts of the polyarylene containing the sulfonic acid.

Polymer Electrolyte Membrane

A polyarylene copolymer containing the sulfonic acid according to the present invention, which consists of the abovementioned copolymers, may be utilized in the form of membrane, solution or powder. However, it is preferably utilized in the form of a membrane or solution (hereinafter sometimes referring to the form of membrane, as a "polymer electrolyte membrane", or a "proton conductive membrane"), when used as an electrolyte for primary cell, an electrolyte for secondary cell, a high polymer solid electrolyte for fuel cell, a display device, a variety of sensors, a signal transfer medium, a solid condenser, an ion exchange membrane, or the like.

The polymer electrolyte membrane used for the present invention may be produced by a casting process in which the sulfonated polyarylene copolymer having the sulfonic acid is mixed with an organic solvent, and then the mixture is poured over a substrate to form a film. The appropriate substrate may be selected without any particular limitations from those utilized in conventional solution casting processes, for example, a substrate of plastics or metals, and preferably of thermoplastic resins, such as polyethylene terephthalate (PET) film.

The appropriate solvent for mixing with the polyarylene copolymers containing the sulfonic acid may be selected from those which are capable of dissolving or swelling the copolymer without any particular limitations; and examples thereof include, aprotic polar solvents such as N-methyl-2-pyrrolidone, N,N-dimethyl formamide, gamma-butyrolactone, N,N-dimethyl acetamide, dimethyl sulfoxide, dimethyl urea, dimethyl imidazolidinone and acetonitrile; chlorinated solvents such as dichloromethane, chloroform, 1,2-dichloroethane, chlorobenzene and dichlorobenzene; alcohols such as methanol, ethanol, propanol, isopropyl alcohol, sec-butyl alcohol and tert-butyl alcohol; alkyleneglycol monoalkylethers such as ethyleneglycol monomethylether, ethyleneglycol monoethylether and propyleneglycol monoethylether; ketones such as acetone, methyl ethyl ketone, cyclohexanone and gamma-butyrolactone; ethers such as tetrahydrofuran and 1,3-dioxane. These solvents may be used alone or in combination. Among these, N-methyl-2-pyrrolidone (hereinafter referred to as "NMP") is preferable from the viewpoint of solubility and viscosity.

When a solvent mixture containing an aprotic polar solvent and another solvent is used as the solvent, the content of the aprotic polar solvent is 25 to 95 mass %, preferably 25 to 90 mass %, and the content of the other solvent is 5 to 75 mass %, preferably 10 to 75 mass %, with a provision that the total content is 100 mass %. The other solvent which is within range may have an excellent effect on decreasing the solution viscosity. Preferably, the combination of the solvents is such that NMP is selected as the aprotic polar solvent, and methanol is selected for the other solvent in order to decrease the viscosity in a broader composition range.

The concentration of the polymer in the solution dissolving the polymer and additives depends on the molecular weight of the polyarylene copolymer containing the sulfonic acid; typically the concentration of the polymer is 5 to 40 mass %, and preferably 7 to 25 mass %. When the polymer concentration is less than 5 mass %, a thicker membrane is difficult to obtain, and pinholes tend to occur. On the other hand, when the polymer concentration is more than 40 mass %, the solution viscosity is too high to properly form a film, and the surface smoothness may also be deteriorated.

The solution viscosity is typically 2,000 to 100,000 mPa·s, and preferably 3,000 to 50,000 mPa·s, in which the solution viscosity depends on the molecular weight of the polyarylene copolymer, concentration of the polymers, and the concentration of additives. When the solution viscosity is less than 2,000 mPa·s, the retaining property of the solution is likely to be insufficient during the film-forming process, and thus the solution sometimes flows out of the substrate. When the solution viscosity is more than 100,000 mPa·s, the viscosity is too high to extrude the solution from a die, and thus the film is difficult to produce by means of flowing processes.

The resulting non-dried film is immersed in water after being produced. Thereby, the organic solvent in the non-dried film can be replaced with water, and the residual solvent can be reduced within the polymer electrolyte membrane.

The non-dried film may be pre-dried before immersing them into water. The pre-drying is typically carried out at 50 to 150 degrees C. for 0.1 to 10 hours.

When the non-dried film (hereinafter including "pre-dried film") is immersed into water, the film piece may be immersed into water by a batch method; and alternatively, a continuous method may be carried out such that an intact laminate film formed on a substrate film, e.g., PET or a membrane separated from the substrate, is immersed into water and wound up successively. In the batch process, it is preferred that the non-dried films be fitted into a frame and then immersed into water so as to prevent wrinkles on the surface of the films after the processing.

The amount of water utilized when immersing the non-dried films is 10 weight parts or more, preferably 30 weight parts or more, and more preferably 50 weight parts or more based on one weight part of the non-dried films. When the amount of water is in range, the amount of solvent that remains within the resulting proton conductive membrane may be reduced. In addition, the concentration of the organic solvent is maintained at or under a certain level, to effectively reduce the amount of solvent that remains within the resulting solid polymer electrolyte membrane, for example, when the water used for immersion is exchanged or overflowed. Furthermore, the concentration of the organic solvent in the water is effectively homogenized by stirring, for example, in order to reduce the two-dimensional distribution of the residual organic solvent within the solid polymer electrolyte membrane.

The temperature of the water, in which the non-dried film is immersed, is typically 5 to 80 degrees C., and preferably 10 to 60 degrees C. from the viewpoint of replacing rate and easy handling. The higher the temperature, the higher the rate of replacement of the organic solvent with water and the higher the absorption of the film; however, the surface of the polymer electrolyte membrane may be deteriorated after drying. The immersing period of the film depends on the initial content of the residual solvent, amount of water used, and processing temperature; in which the period is typically 10 minutes to 240 hours, and preferably 30 minutes to 100 hours.

When non-dried films are dried after being immersed into water, the membrane may be obtained with a lower solvent content. The content of the residual solvent within the membranes obtained in such processes is usually no more than 5 mass %. By appropriately selecting the immersion conditions, the content of the residual solvent may be decreased to as low as no more than 1 mass %. This lower solvent content may be due to conditions, for example, in which the water content is 50 weight parts or more, the amount of the non-dried film is 1 weight part, the water temperature is 10 to 60 degrees C. at the time of immersion, and the immersion period is 10 minutes to 10 hours.

After immersing the non-dried films into water as described above, the film is dried at 30 to 100 degrees C. for 10 to 180 minutes, preferably at 50 to 80 degrees C. for 15 to 60 minutes. Then the film is dried at 50 to 150 degrees C., preferably under a vacuum of 500 mmHg to 0.1 mmHg for 0.5 to 24 hours, and thereby the polymer electrolyte membrane may be obtained.

The thickness of the resulting polymer electrolyte membrane is typically 10 to 100 µm, and more preferably 20 to 80 µm in the dried condition.

In addition, the polyarylene copolymer containing the sulfonic ester group or the alkaline metal salt of sulfonic acid may be formed into a film by the processes described above and subjected to an appropriate post-treatment such as hydrolysis or acid treatment, and thereby the polymer electrolyte membrane according to the present invention may be produced. Specifically, the polyarylene copolymer containing the alkaline metal salt of sulfonic acid may be formed into a film by the processes described above and subjected to hydrolysis or acid treatment, and thereby the polymer electrolyte membrane containing the sulfonic acid may be produced.

In addition to the polyarylene copolymer containing the sulfonic acid, an inorganic acid such as sulfuric acid or phosphoric acid, phosphoric acid glass, tungstic acid, phosphate hydrate, beta-alumina proton-derivative substitution, proton-conductive inorganic particles such as a proton-including oxide, carboxylic acid-containing organic acid, sulfonic acid-containing organic acid, phosphoric acid-containing organic acid, or an appropriate amount of water may also be incorporated in the process for producing the polymer electrolyte membrane.

Electrode

The catalyst used for the present invention is preferably a supported catalyst in which platinum or a platinum alloy is supported on a porous carbon material. A carbon black or activated carbon may be used for the porous carbon material. Examples of the carbon blacks include a channel black, a furnace black, a thermal black, and an acetylene black; the activated carbons may be those produced through carbonizing and activating various carbon-containing materials.

The catalyst formed by supporting the platinum or platinum alloy on a carbon carrier may be used. The platinum alloy may afford stability and activity as an electrode catalyst. Preferably, the platinum alloys are used which are formed from platinum and at least one metal selected from the platinum group of metals other than platinum (i.e., ruthenium, rhodium, palladium, osmium or iridium), or metals of other groups such as cobalt, iron, titanium, gold, silver, chrome, manganese, molybdenum, tungsten, aluminum, silicon, rhenium, zinc or tin; and the platinum alloys may include an intermetallic compound which is formed of platinum and other metals which are alloyable with platinum.

Preferably, the supported content of the platinum or platinum alloy (i.e., mass % of platinum or platinum alloy on the basis of the overall mass of catalyst) is 20 to 80 mass %, and in particular 30 to 55 mass %, since the range may provide higher output power. However, when the supported content is less than 20 mass %, sufficient output power may not be attained, and when over 80 mass %, the particles of platinum or platinum alloy may not be supported on the carbon carrier material with sufficient dispersibility.

The primary particle size of the platinum or platinum alloy is preferably 1 to 20 nm so as to obtain highly active gas-diffusion electrodes. In particular, the primary particle size is preferably 2 to 5 nm to ensure the platinum and platinum alloy have a larger surface area from the viewpoint of reaction activity.

The catalyst layers in the present invention include, in addition to the supported catalyst, an ion conductive polymer electrolyte or ion conductive binder that contains a sulfonic acid group. Usually, the supported catalysts are covered with the electrolyte, and thus a proton (H+) travels through the pathway of the connecting electrolyte.

Perfluorocarbon polymers exemplified by Nafion, Flemion and Aciplex are appropriately used for the ion conductive polymer electrolyte containing the sulfonic acid group. The ion conductive polymer electrolyte based on the aromatic hydrocarbon compound such as the sulfonated polyarylene described in this specification may be used in place of the perfluorocarbon polymer.

Preferably, the ion conductive binders are included in a mass ratio of 0.1 to 3.0, preferably 0.3 to 2.0 in particular based on the mass of the catalyst particles. When the ratio of the ion conductive binder is less than 0.1, a proton may not be conducted into the electrolyte, and thus possibly resulting in an insufficient power output. However, when the ratio is more than 3.0, the ion conductive binder may cover the catalyst particles completely, and thus gas cannot reach the platinum, resulting possibly in insufficient power output.

The membrane electrode assembly according to the present invention may be formed solely of an anodic catalyst layer, a cathodic catalyst layer, and a proton conductive membrane; in which, more preferably, a gas diffusion layer formed of conductive porous material such as carbon paper and carbon cloth is disposed outside the catalyst layer along with the anode and cathode. The gas diffusion layer may act as an electric collector, and therefore, the combination of the gas diffusion layer and the catalyst layer is referred to as an "electrode" in this specification, when the gas diffusion layer is provided.

In the solid polymer electrolyte fuel cell equipped with the membrane electrode assembly according to the present invention, oxygen-containing gas is supplied to the cathode and hydrogen-containing gas is supplied to the anode. Specifically, separators having channels for gas passages are disposed outside both electrodes, gas flows into the passages, and thereby the gas for fuel is supplied to the membrane electrode assembly. As described above, the membrane electrode assembly according to the present invention may yield highly effective power generation under lower humidity conditions in particular.

The method for producing the membrane electrode assembly may be selected from various methods: a catalyst layer is formed directly on an ion-exchange membrane and is sandwiched with a gas diffusion layer as required; a catalyst layer is formed on a substrate for a gas diffusion layer such as carbon paper, then the catalyst layer is connected with an ion-exchange membrane; and a catalyst layer is formed on a flat plate, the catalyst layer is transferred onto an ion-exchange membrane, and then the flat plate is peeled away, and sandwiched with a gas diffusion layer as required.

The method for forming the catalyst layer may be selected from conventional methods such that the supported catalyst and perfluorocarbon polymer having a sulfonic acid group are dispersed into a medium to prepare dispersion. Optionally, a water repellent agent, pore-forming agent, thickener, diluent and the like are added to the dispersion. Then the dispersion is sprayed, coated or filtered on an ion-exchange membrane, gas-diffusion layer or flat plate. In cases in which the catalyst layer is not formed on the ion-exchange layer directly, the catalyst layer and the ion-exchange layer are preferably connected by means of a hot press or adhesion process, etc. (see Japanese Unexamined Patent Application Laid-Open No. 07-220741).

EXAMPLES

The present invention will be explained more specifically with reference to examples, which are not intended to limit the scope of the present invention. The methods or ways to determine various measurements in the examples are also illustrated in the following. The sulfonated polymer film utilized in the various measurements was prepared by a casting process after dissolving the sulfonated polymer into N-methylpyrrolidone/methanol solution.

Weight Average Molecular Weight

Weight average molecular number (Mn) and weight average molecular weight (Mw) of the copolymer were determined as the molecular weight based on polystyrene standard by gel permeation chromatography (GPC) using NMP solvent.

Equivalent Amount of Sulfonic Acid Group

The resulting sulfonated polymers were washed with distilled water until becoming neutral, so as to sufficiently remove free residual acid, and then dried. The polymers were then weighed in a predetermined amount, dissolved into a mixed solvent of THF/water, titrated with NaOH standard solution. The ion-exchange capacity was determined from the neutralization point in terms of the equivalent of sulfonic acid group (meq/g).

Measurement of Tensile Strength and Elastic Modulus

Tensile strength and elastic modulus were determined in accordance with JIS K 7113 in which the pulling rate was 50 mm/min. The elastic modulus was calculated in a way in which the distance between markers was regarded as the distance between chucks. Test samples were conditioned at a temperature of 23±2 degrees C. and relative humidity (RH) of 50±5% for 48 hours in accordance with JIS K 7113. The test samples were punched out by use of number 7 dumbbells according to JIS K 6251, and the tensile property measuring equipment was 5540 series—5543 (by INSTRON Corp.).

Measurement of Proton Conductivity

AC resistance was first measured by platinum wires 0.5 mm in diameter being pushed onto a surface of a test membrane, formed into a strip of 5 mm width. The test membrane was placed in a controlled temperature/humidity chamber, and then AC impedance was measured between the platinum wires. The impedance was measured for AC 10 kHz under conditions of 85 degrees C and a relative humidity 90%. The measurements were performed by use of Chemical Impedance Measuring System (by NF Corporation), the controlled temperature/humidity chamber was JW241 (by Yamato Scientific Co., Ltd.). Five platinum wires were pushed onto the surface at an interval of 5 mm, the distance between the lines was varied at 5 to 20 mm, and the AC resistance was measured. The specific resistance of membrane was then calculated from the slope of the relationship between line distances and resistances, and the proton conductivity was determined as the inverse value of the specific resistance.

$$\text{Specific Resistance } R \text{ (ohm·cm)}=0.5 \text{ (cm)}\times\text{Membrane Thickness (cm)}\times\text{Slope (ohm/cm)}$$

Heat Test

A sulfonated film cut into 2 cm by 3 cm into a piece was sandwiched by BEMCOT (registered trademark), put into a sample tube made from glass, and then heated to 160 degrees C. in a temperature controlled bath (AWC-2) for 24 hours in air atmosphere. The heated file was dissolved into NMP at 0.2 mass % to determine the molecular weight and area (A24) by GPC (HLC-8220 produced by TOSOH CORPORATION) using NMP buffer solution. The molecular weight and area (A0) of the preheated file was measured under the same conditions to determine changes in the molecular weight and the insoluble rate by using the following expression.

$$\text{Insoluble rate}(\%)=(A24-A0)/(A0)$$

Example 1

Synthesis of Sulfonic Acid Unit 114.6 g (0.6 mmol) of 2,5-dichlorobenzoic acid to be dissolved and 500 ml of phosphorus pentoxide/methanesulfonic acid (PPMA) were added into a 2 L three-necked flask equipped with a stirrer, thermometer, and nitrogen inlet tube. The flask was cooled in an ice bath, and then 196.4 g (1.8 mol) of 2-aminophenol was gradually added. Then, the mixture was heated to 110 degrees C. After the reaction, the mixture was dripped into ice water, extracted by ethyl acetate. After the extract was neutralized by 1% of sodium hydrogen carbonate water solution, and washed in saturated saline, it was concentrated. The concentration was recrystallized by methanol to obtain the following formula (8-1-A). The yield was 134 g, and the melting point was 101 to 102 degrees C.

100.4 g (0.38 mmol) of the compound expressed by the following formula (8-1-A) to be dissolved, and 440 g of chrolosulfonic acid to be dissolved were added into a 1 L three-necked flask equipped with a stirrer, thermometer, and nitrogen inlet tube, and then heated between 95 to 100 degrees C. to react for 15 hours. After the disappearance of material was confirmed by a thin layer chromatography, and the mixture was extracted by ethyl acetate. After the extract was neutralized by 1% of sodium hydrogen carbonate water solution, it was washed in saturated saline, it was concentrated. The concentration was recrystallized by methanol to obtain the following formula (8-1-B). The mixture expressed by the formula (8-1-B) was confirmed by NMR to consist of a positional isomer in which the substitution position of a chlorosulphonyl group differed. The yield was 119 g.

Figure 2:
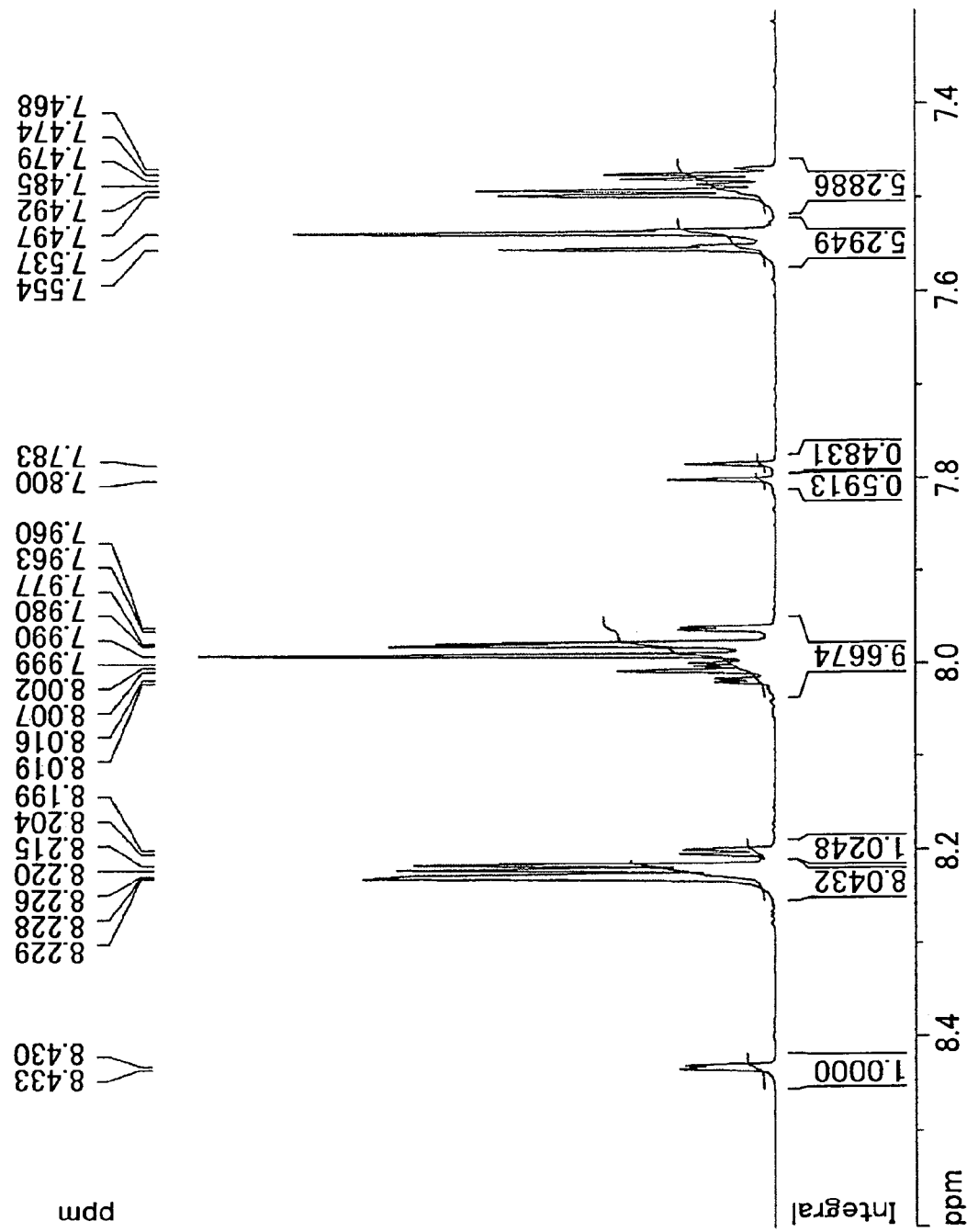
FIG. 2 shows an enlarged view of the 7.4 to 8.6 ppm chemical shift in FIG. 2.

83.4 g (0.23 mol) of the compound expressed by the following formula (8-1-B) and 29.5 g (0.253 mol) of neopentyl alcohol to be dissolved, 482 g of pyridine, were added into a 1 L three-necked flask equipped with a stirrer, thermometer, and nitrogen inlet tube, and then reacted at 5 to 10 degrees C. for 8 hours. After the reaction, the mixture was dripped into 1% of hydrochloric acid in ice water to be extracted by ethyl acetate. After the extract was neutralized by 1% sodium hydrogen carbonate water solution, washed in saturated saline, it was concentrated. The concentration was recrystallized by ethyl acetate/methanol to obtain a compound expressed by the following formula (8-1). The compound was confirmed by NMR to consist of positional isomer, in which the substitution position of a neopentylester group differed. The yield was 77 g. FIG. 1 shows the $^1$H-NMR spectra of this compound, and FIG. 2 shows an enlarged view of FIG. 1, which shows a 7.4 ppm to 8.6 ppm chemical shift that corresponds to part X in FIG. 1.

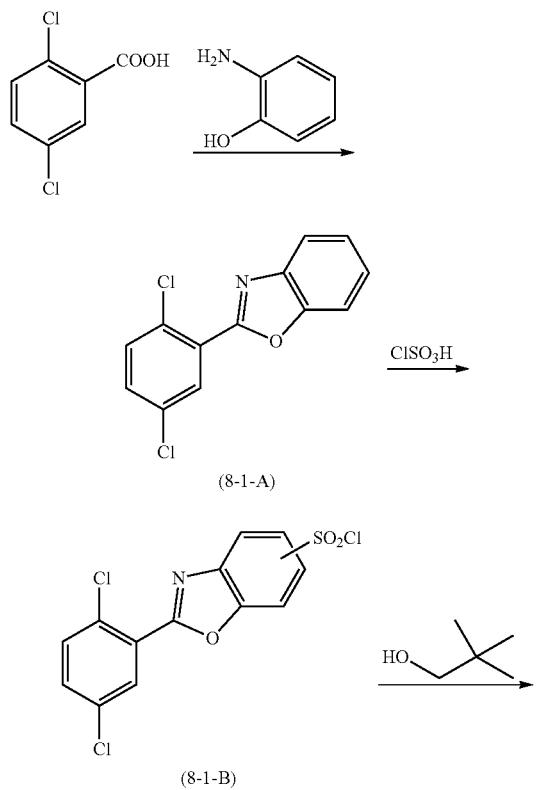

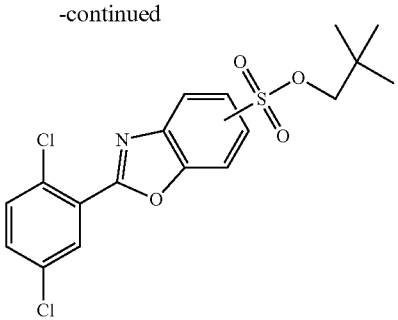

(8-1)

Synthesis of Hydrophobic Unit 67.3 g (0.20 mol) of 2,2-bis(4-hydroxyphenyl)-1,1,1,3,3,3-hexafluoropropane, 60.3 g (0.24 mol) of 4,4'-dichlorobenzophenone (4,4'-DCBP), 71.9 g (0.52 mol) of potassium carbonate, 300 ml of N,N-dimethylacetamide (DMAc), and 150 ml of toluene were added into a 1 L three-necked flask equipped with a stirrer, a thermometer, a cooling pipe, a Dean-Stark apparatus, and a three-way stopcock for introducing nitrogen. The mixture was heated by use of an oil bath, and was allowed to react at 130 degrees C. in a nitrogen atmosphere while being stirred. The reaction was carried out while the water generated through the reaction was co-distilled with toluene, and removed through the Dean-Stark apparatus. After three hours, water generation fell to nearly zero. The temperature of the reaction mixture was then raised gradually from 130 degrees C. to 150 degrees C., and thus nearly all of the toluene was removed. The mixture was allowed to further react at 150 degrees C. for 10 hours, and afterwards 10.0 g (0.040 mole) of 4,4'-DCBP was added, and was allowed to react for another 5 hours. The resulting reaction liquid was allowed to cool, and then the byproduct inorganic precipitate was filtered out, and the filtrate was poured into 4 L of methanol. The deposited product was filtered, collected, and dried. Afterwards, it was dissolved into 300 ml of tetrahydrofuran, which was poured into 4 L of methanol to be precipitated again, and thereby 95 g of the intended product was obtained at an 85% yield.

The number average molecular weight of the resulting polymer was 11,200 based on polystyrene standard by means of GPC using THF solvent. The resulting compound was an oligomer expressed by the formula (8-2).

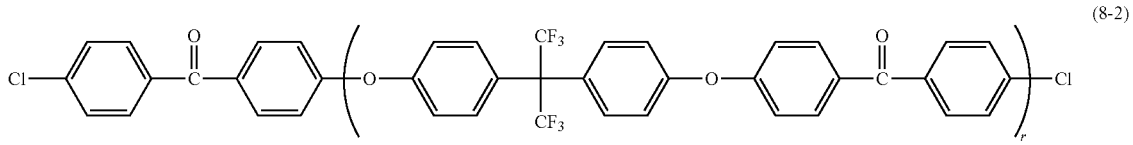

(8-2)

Synthesis of Polymer 166 ml of DMAc was added to a mixture of 40.89 g (98.7 mmol) of the compound expressed by the formula (8-1), 14.56 g (1.3 mmol) of the hydrophobic unit expressed by the formula (8-2), 3.27 g (5.0 mmol) of bis(triphenylphosphine) nickel dichloride, 10.49 g (40 mmol) of triphenylphosphine, 0.45 g (3.0 mmol) of sodium iodide and 15.69 g (240 mmol) of zinc in a nitrogen atmosphere.

The reaction mixture was heated while stirring 79 degrees C. for the last time and allowed to react for 3 hours. The viscosity increase of the reaction mixture was observed during the reaction period. The polymerization reaction solution was diluted with 390 ml of DMAc, the mixture was stirred for 30 minutes, and then was filtered by use of celite as a filter aid.

Figure 3:
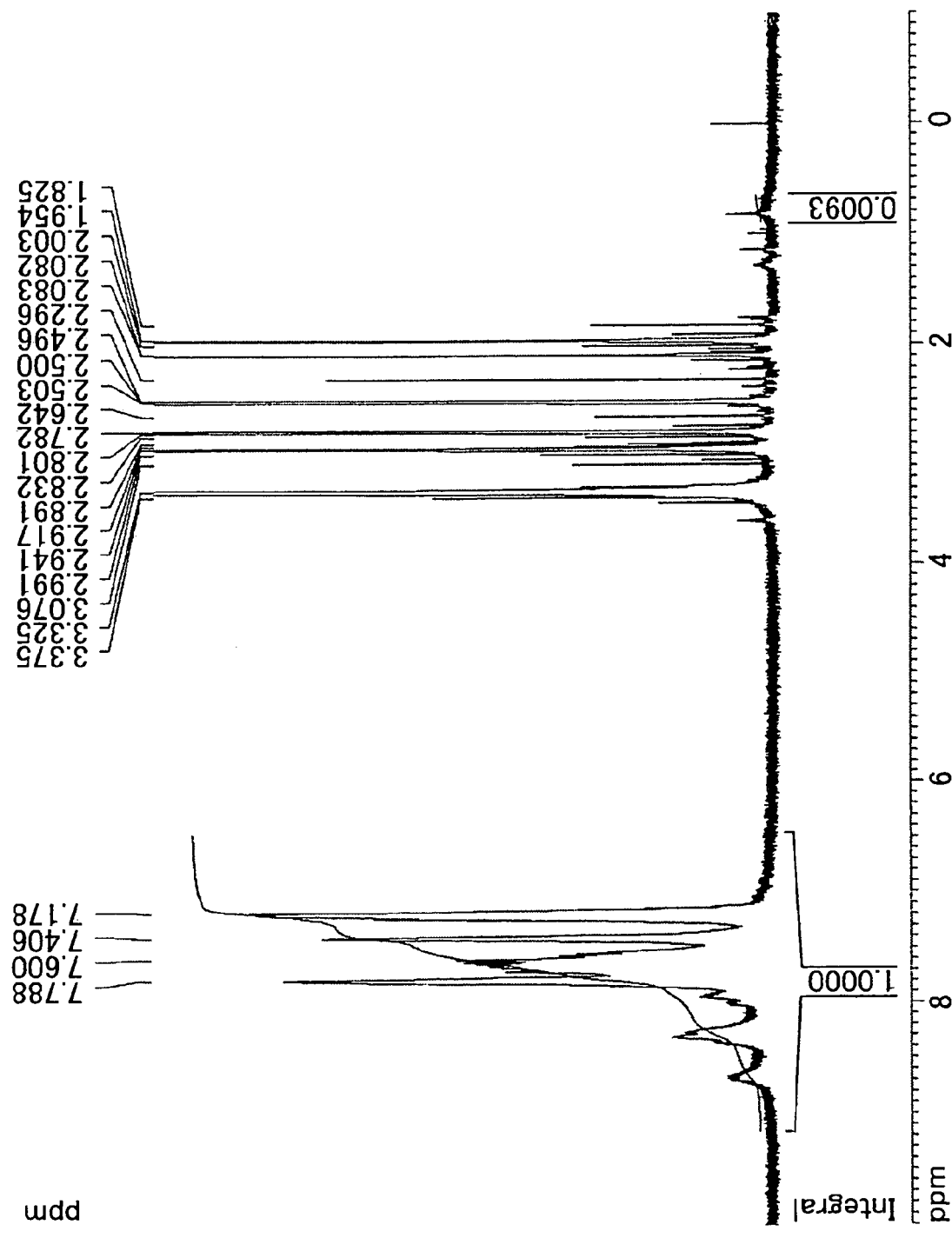
FIG. 3 shows $^1$H-NMR spectra of sulfonic acid unit expressed by the formula (8-3) obtained in Example 1.

25.72 g (296.1 mmol) of lithium bromide are added into the resulting filtrate, and then reacted at 110 degrees C. for 7 hours in a nitrogen atmosphere. After the reaction period, the reaction mixture was cooled to ambient temperature, and then was poured into 4 L of acetone to cause coagulation. The coagulated material was filtered, air-dried, milled by a mixer, and then was washed with 1500 ml of 1N HCl while stirring. After filtration, the product was washed with deionized water until the pH of the solution was no less than 5. The resulting polymer had a molecular weight of Mn=47,000 and Mw=197,000 measured by GPC. The ion-exchange capacity of the polymer was 2.25 meq/g. The resulting polymer was expressed by the formula (8-3). FIG. 3 shows the $^1$H-NMR spectra of this compound.

Preparation of Membrane Electrode Assembly i) Catalyst Paste

Platinum particles were supported on carbon black (furnace) having an average particle size of 50 nm in a weight ratio 1:1 of carbon black:platinum to prepare the catalyst particles. The catalyst particles were dispersed uniformly into a perfluoroalkylene sulfonic acid polymer compound solution (Nafion (product name), by DuPont) as an ion conductive binder, in a weight ratio 8:5 of ion conductive binder:catalyst particles, thereby preparing a catalyst paste.

ii) Gas Diffusion Layer

The carbon black and polytetrafluoroethylene (PTFE) particles were mixed in a weight ratio 4:6 of carbon black:PTFE particles, and the resulting mixture was dispersed uniformly into ethylene glycol to prepare a slurry. Then the slurry was coated and dried on one side of carbon paper to form an underlying layer, and two gas diffusion layers formed of the underlying layer and the carbon paper were thereby prepared.

iii) Preparation of Electrode-Coating Membrane (CCM)

To both sides of the proton conductive membrane, prepared in the example described above, the catalyst paste was coated by use of a bar coater in an amount in which the platinum content was 0.5 mg/cm$^2$, and was dried to prepare an electrode-coating membrane (CCM). During the drying step, a first drying at 100 degrees C. for 15 minutes was followed by a secondary drying at 140 degrees C. for 10 minutes.

iv) Preparation of Conjunction of Membranes and Electrodes

A conjunction of membranes and electrodes was prepared in such a way that the CCM was gripped at the side of the underlying layer of the gas diffusion layer, and then was subjected to hot-pressing. In the hot-pressing step, a first hot-pressing at 80 degrees C. and 5 MPa for 2 minutes was followed by a second hot-pressing at 160 degrees C. and 4 MPa for 1 minute.

In addition, solid polymer electrolyte fuel cell may be constructed from the membrane electrode assembly according to the present invention in such a way that a separator, being also usable as a gas passage, is laminated on the gas diffusion layer.

Example 2

Synthesis of Hydrophobic Unit 154.8 g (0.9 mol) of 2,6-dichlorobenzonitrile, 269.0 g (0.8 mol) of 2,2-bis(4-hydroxyphenyl)-1,1,1,3,3,3-hexafluoropropane, 143.7 g (1.04 mol) of potassium carbonate were added into a 1 L three-necked flask equipped with a stirrer, a thermometer, a Dean-Stark apparatus, a nitrogen inlet tube,

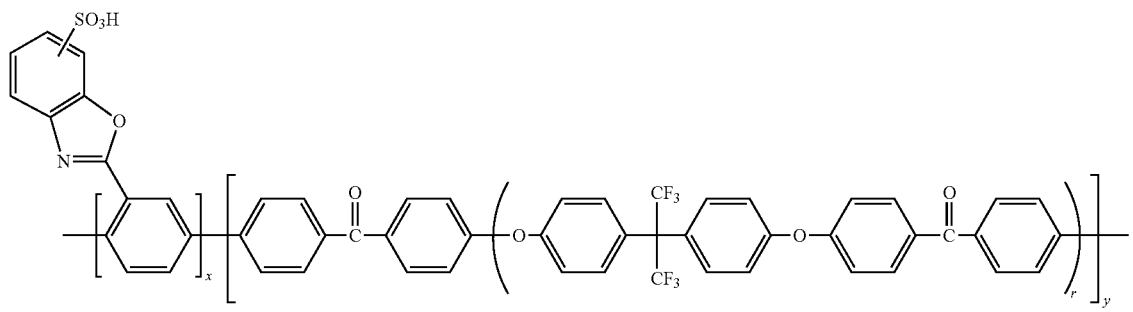

(8-3)

and a cooling pipe. After being purged with nitrogen, 1020 ml of sulfolane and 510 ml of toluene were added and stirred, and then the reaction liquid was heated to 150 degrees C. and refluxed by use of an oil bath. Water generated through the reaction was trapped in the Dean-Stark apparatus. After three hours, when water generation became nearly zero, the toluene was removed from the Dean-Stark apparatus. The temperature of the reaction mixture was gradually raised to 200 degrees C., stirring was continued for 3 hours, and afterwards 51.6 g (0.3 mol) of 2,6-dichlorobenzonitrile was added, and this was allowed to further react for 5 hours.

The reaction liquid was allowed to cool and then diluted by adding 250 ml of toluene. The inorganic salts which were insoluble in the reaction liquid were filtered, and then the filtrate was poured into 8 L of methanol to cause precipitation. The precipitated product was filtered, dried, and then dissolved into 500 ml of tetrahydrofuran, The solution was then poured into 5 L of methanol to cause re-precipitation. The precipitated white powder was filtered and dried, and thereby 258 g of the intended product was obtained. The resulting polymer had a molecular weight of Mn=7.500 measured by GPC. The resulting compound was an oligomer expressed by the formula (8-4).

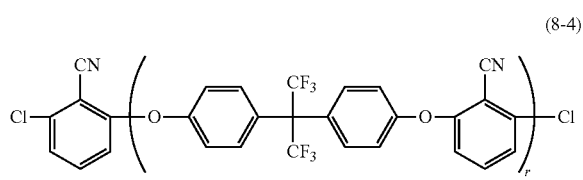

(8-4)

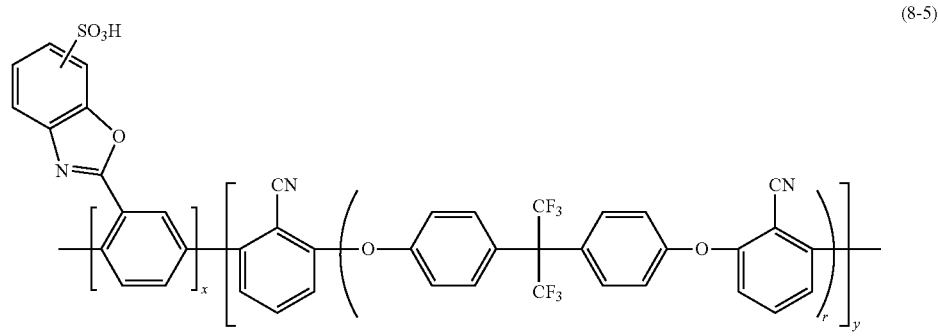

(8-5)

Synthesis of Polymer

The polymer was synthesized in the same manner as Example 1, except that the solid the hydrophobic unit expressed by the formula (8-4) was applied.

Figure 4:
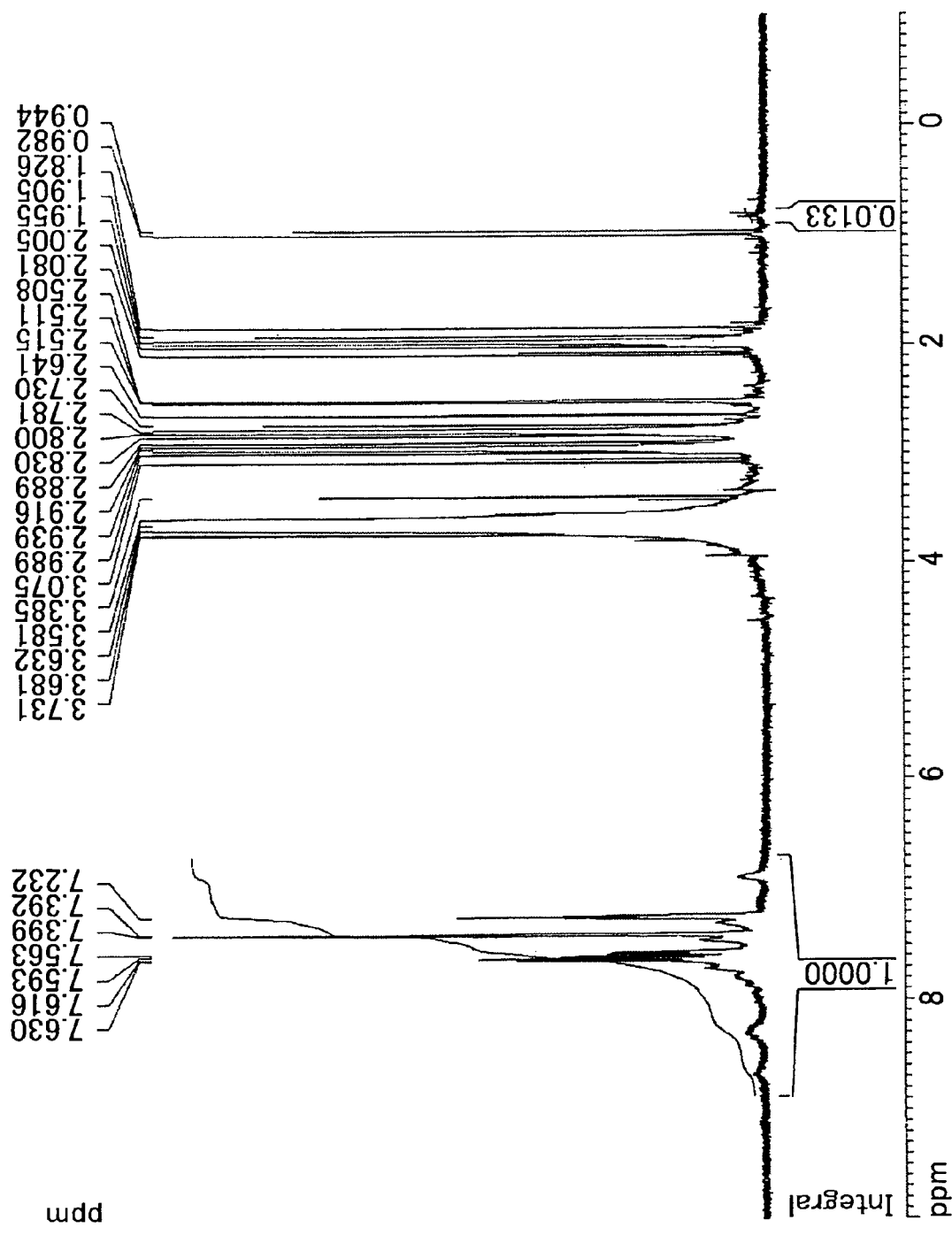
FIG. 4 shows $^1$H-NMR spectra of sulfonic acid unit expressed by the formula (8-5) obtained in Example 2.

The resulting polymer had a molecular weight of Mn=38,000 and Mw=104,000 when measured by GPC. The ion exchange capacity was 2.30 meq/g. The resulting polymer was expressed by the formula (8-5). FIG. 4 shows the $^1$H-NMR spectra of this polymer.

Preparation of Membrane Electrode Assembly

The membrane electrode assembly was obtained in the same manner as Example 1, except that the polymers obtained from Examples were applied.

Example 3

Synthesis of Hydrophobic Unit 20.2 g (60.2 mmol) of 2,2-bis(4-hydroxyphenyl)-1,1,1,3,3,3-hexafluoropropane, 18.1 g (51.6 mmol) of 9,9-bis(4-hydroxyphenyl)fluorene, 29.6 g (103 mmol) of 4,4'-dichlorodiphenylsulfone, and 20.1 g (145 mmol) of potassium carbonate were added into a 1 L three-necked flask equipped with a stirrer, a thermometer, a Dean-Stark apparatus, a nitrogen inlet tube, and a cooling pipe. After purging with nitrogen, 170 ml of sulfolane and 85 ml of toluene were added and stirred, and then the reaction liquid was heated to 150 degrees C. and refluxed by use of an oil bath. The water generated through the reaction was trapped in the Dean-Stark apparatus. After three hours, when the water generation became nearly zero, the toluene was removed from the Dean-Stark apparatus. The temperature of the reaction mixture was gradually raised to 200 degrees C., stirring was continued for 5 hours, and then 10.8 g (43 mmol) of 4,4'-dichlorodiphenone was added, and this was allowed to further react for 8 hours.

The reaction liquid was allowed to cool and then diluted by adding 100 ml of toluene. The inorganic salts which were insoluble in the reaction liquid were filtered, and then the filtrate was poured into 2 L of methanol to cause precipitation. The precipitated product was filtered, dried, and then dissolved into 250 ml of tetrahydrofuran. The solution was then poured into 2 L of methanol to cause re-precipitation. The precipitated white powder was filtered and dried, and 56.5 g of the hydrophobic unit was thereby obtained. The number average molecular weight measured by GPC was 7,800. The resulting compound was an oligomer expressed by the formula (8-6). In the formula (8-6), the ratio of a:b was 54:46.

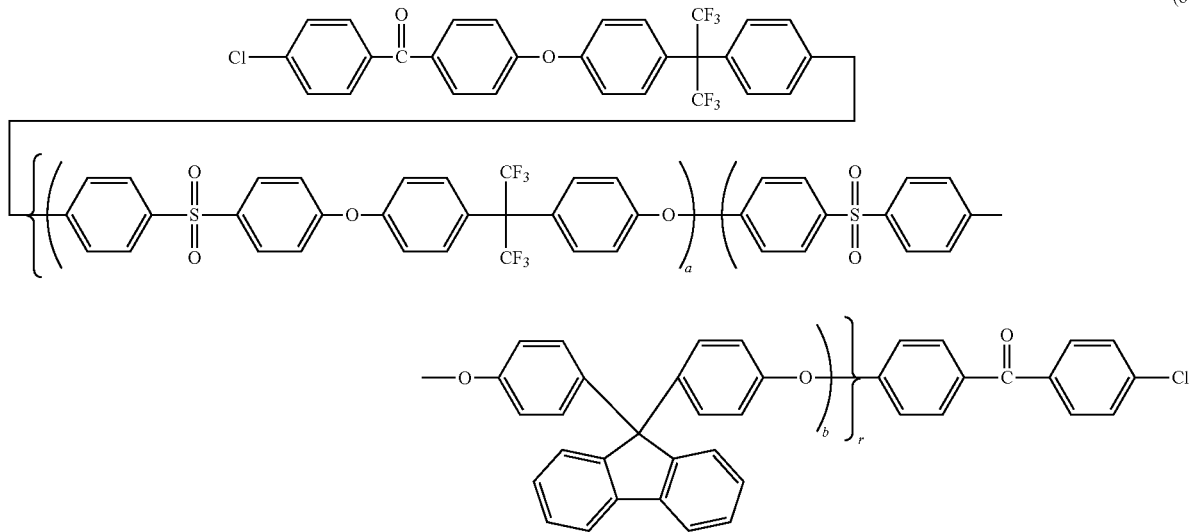
(8-6)
Synthesis of Polymer
The polymer was synthesized in the same manner as Example 1, except that the hydrophobic unit expressed by the formula (8-6) was applied.
The resulting polymer had a molecular weight of Mn=38,000 and Mw=93,000 as measured by GPC. The ion exchange capacity was 2.30 meq/g. The resulting polymer was expressed by the formula (8-7).
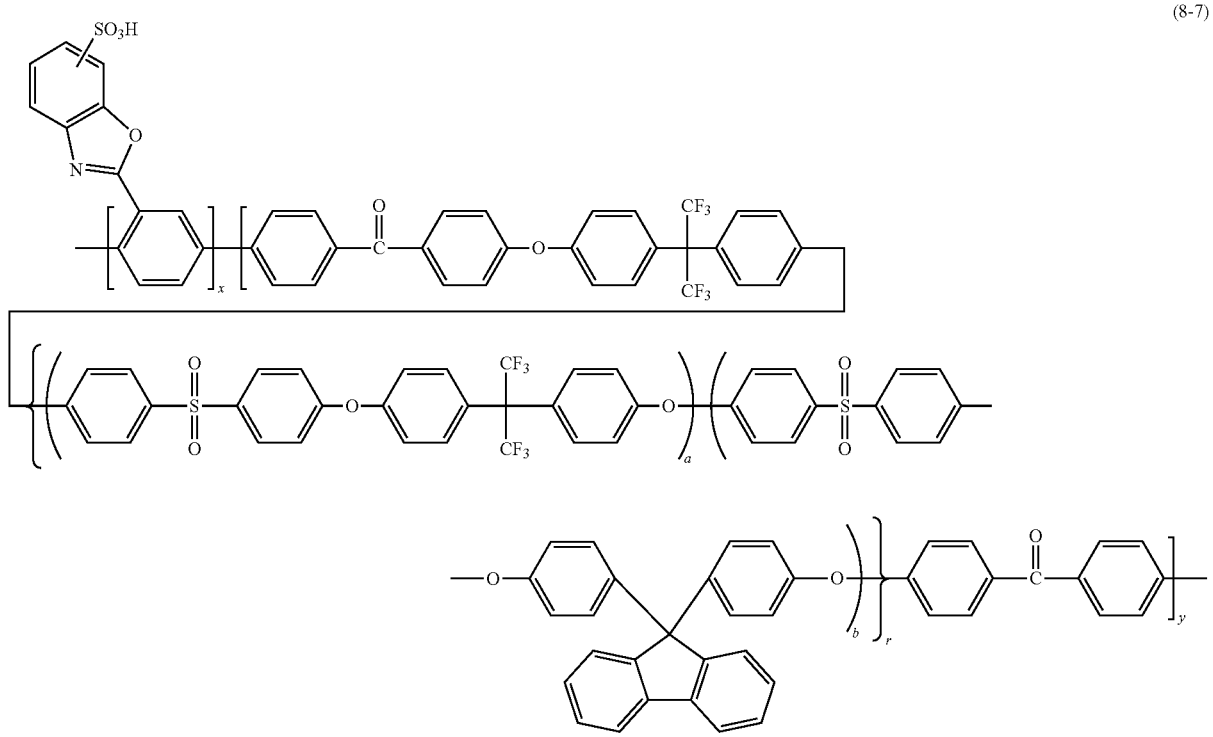
(8-7)

Preparation of Membrane Electrode Assembly

The membrane electrode assembly was obtained in the same manner as Example 1, except that the polymer obtained from Example 2 was applied.

Example 4

Synthesis of Hydrophobic Unit 44.5 g (259 mmol) of 2,6-dichlorobenzonitrile, 102.0 g (291 mmol) of 9,9-bis(4-hydroxyphenyl)fluorene, and 52.3 g (379 mmol) of potassium carbonate were added into a 1 L three-necked flask equipped with a stirrer, a thermometer, a Dean-Stark apparatus, a nitrogen inlet tube, and a cooling pipe. After purging with nitrogen, 366 ml of sulfolane and 183 ml of toluene were added and stirred, and then the reaction liquid was heated to 150 degrees C. and refluxed by use of an oil bath. The water generated through the reaction was trapped in the Dean-Stark apparatus. After three hours, when the water generation became nearly zero, the toluene was removed from the Dean-Stark apparatus. The temperature of the reaction mixture was gradually raised to 200 degrees C., stirring was continued for 3 hours, and then 16.7 g (97 mmol) of 2,6-dichlorobenzonitrile was added, and this was allowed to further react for another 5 hours.

The reaction liquid was allowed to cool and then diluted by adding 100 ml of toluene. Inorganic salt which were insoluble in the reaction liquid were filtered, and then the filtrate was poured into 2 L of methanol to cause precipitation. The precipitated product was filtered, dried, and then dissolved into 250 ml of tetrahydrofuran. The solution was poured into 2 L of methanol to cause re-precipitation. The precipitated white powder was filtered and dried, and thereby 118 g of intended product was obtained, of which the number average molecular weight (Mn) measured by GPC was 7,300. The resulting compound was an oligomer expressed by the formula (8-8).

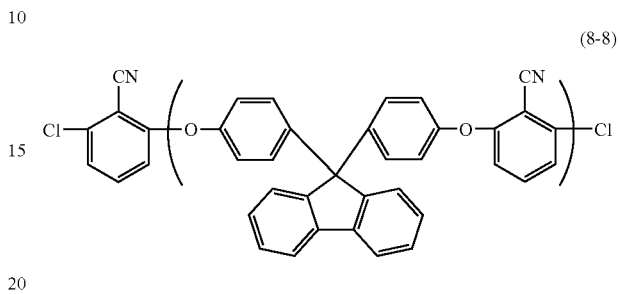

(8-8)

Synthesis of Polymer

The polymer was synthesized in the same manner as Example 1, except that the hydrophobic unit expressed by the formula (8-8) was applied.

The resulting polymer had a molecular weight of Mn=41,000 and Mw=123,000 as measured by GPC. The ion-exchange capacity of the polymer was 2.27 meq/g. The resulting polymer was a compound expressed by the formula (8-9).

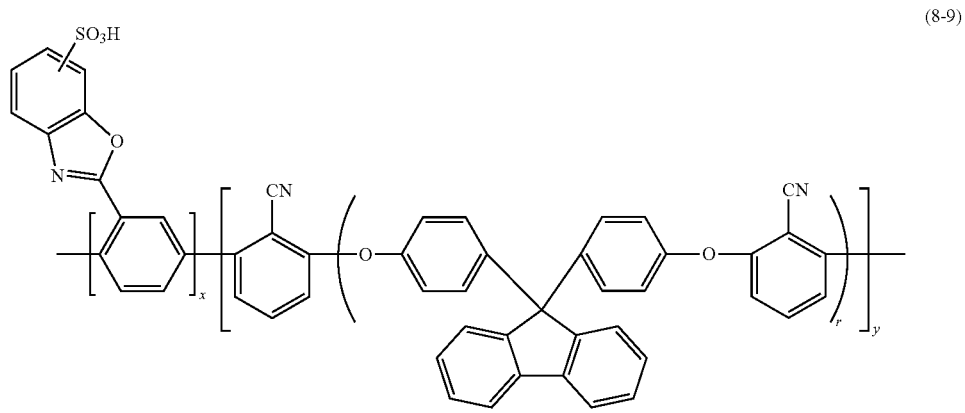

(8-9)

Preparation of Membrane Electrode Assembly

The membrane electrode assembly was obtained in the same manner as Example 1, except that the polymer obtained from Example 4 was employed applied.

Example 5

Synthesis of Hydrophobic Unit 17.8 g (50.0 mmol) of 1,3-bis(4-chlorobenzoyl)benzene, 15.1 g (45.0 mmol) of 2,2-bis(4-hydroxyphenyl)hexafluoropropane, 8.1 g (58.5 mol) of potassium carbonate were added into a 500 ml three-necked flask equipped with a stirrer, a thermometer, and a nitrogen inlet tube, and then stirred at 130 degrees C. in a nitrogen atmosphere. After the water generated through the reaction was co-distilled with toluene, and then the toluene was removed, the residue was stirred at 195 degrees C. for 7 hours. Then, the reaction solution was cooled to 100 degrees C., 5.34 g (15.0 mmol) of 1,3-bis(4-chlorobenzoyl)benzene was added and stirred at 195 degrees C. for 3 hours. The solution was diluted by toluene, and the solid content was removed by use of celite filtration. The filtrate was poured into 2.0 L of methanol/0.2 L of concentrated hydrochloric acid, and was thereby coagulated. The solid body was filtered by use of suction filtration, washed by methanol, and then air-dried. The air-dried material was re-dissolved into the tetrahydrofuran, poured into 3.0 L of methanol, re-solidified reactant. The re-solidified solid body was filtered by suction filtration, air-dried, and then vacuum-dried to obtain the intended hydrophobic unit 22.1 g (yield 75%). The resulting product had a molecular weight of Mn=8,000 and Mw=14,000 measured by GPC (polystyrene conversion). The resulting compound was an oligomer expressed by the formula (8-10).

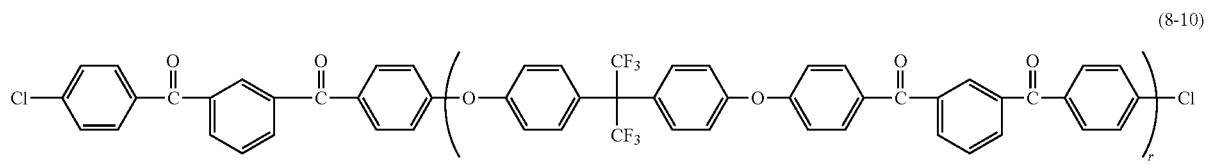

(8-10)

Synthesis of Polymer

The polymer was synthesized in the same manner as Example 1, except that the solid the hydrophobic unit expressed by the formula (8-10) was applied.

The resulting polymer had a molecular weight of Mn=49,000 and Mw=152,000 as measured by GPC. The ion-exchange capacity of the polymer determined to be 2.28 meq/g. The resulting polymer was expressed by the formula (8-11).

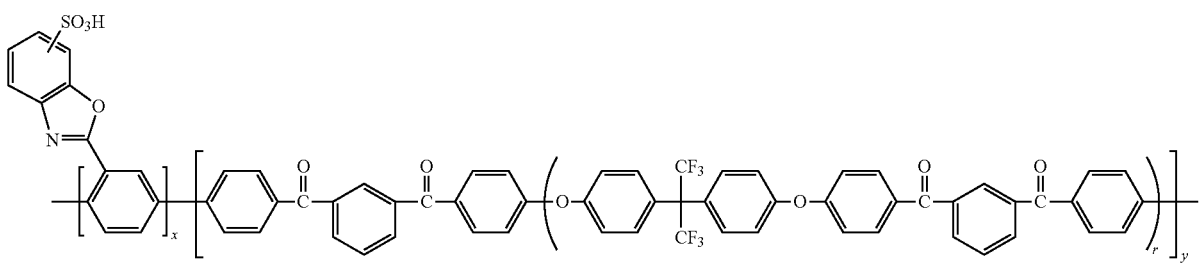

(8-11)

Preparation of Membrane Electrode Assembly

The membrane electrode assembly was obtained in the same manner as Example 1, except that the polymer obtained from Example 5 was applied.

Example 6

Synthesis of Sulfonic Acid Unit

In synthesis of the sulfonic acid unit in Example 1, a sulfonic acid unit expressed by the formula (8-12) was synthesized in the same manner, except that 2-aminophenol was changed into 2-aminothiophenol.

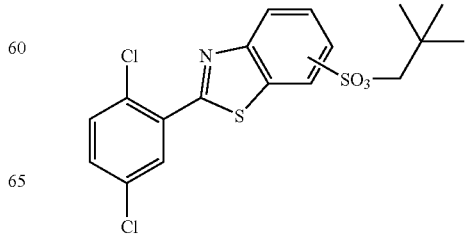

(8-12)

Synthesis of Polymer

In synthesis of the polymer in Example 1, the polymer expressed by the formula (8-13) was synthesized in a same manner, except that the formula (8-1) was changed in the formula (8-12). The resulting polymer had a molecular weight of Mn=46,000 and Mw=139,000 as measured by GPC. The ion exchange capacity was 2.26 meq/g.

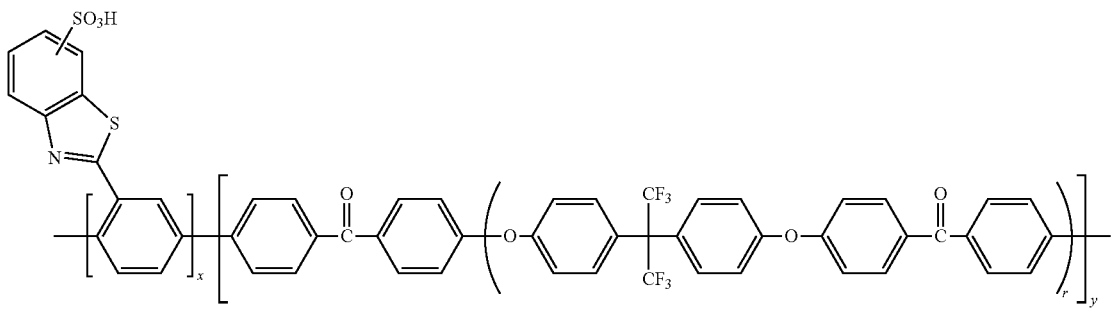

(8-13)

Preparation of Membrane Electrode Assembly

The membrane electrode assembly was obtained in the same manner as Example 1, except that the polymer obtained from Examples 6 was applied.

Example 7

In synthesis of the polymer in Example 2, a polymer expressed by the formula (8-14) was synthesized in the same manner, except that the formula (8-1) was changed into the formula (8-12). The resulting polymer had a molecular weight of Mn=35,000 and Mw=110,000 as measured by GPC. The ion-exchange capacity of the polymer was 2.29 meq/g.

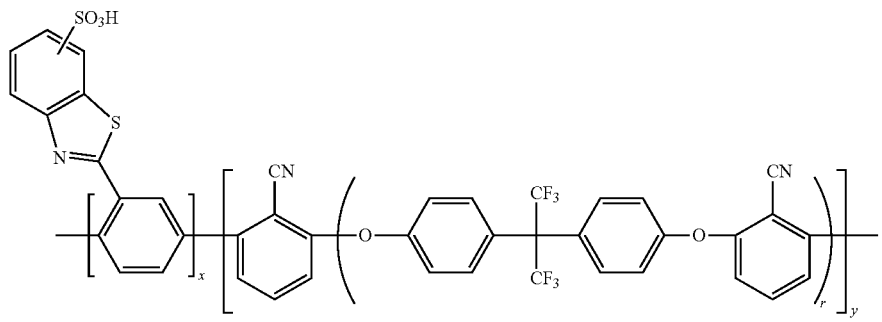

(8-14)

Preparation of Membrane Electrode Assembly

The membrane electrode assembly was obtained in the same manner as Example 1, except that the polymer obtained from Example 7 was applied.

Example 8

In synthesis of the polymer in Example 3, the polymer expressed by the formula (8-15) was synthesized in the same manner, except that the formula (8-1) was changed into the formula (8-12). The resulting polymer had a molecular weight of Mn=40,000 and Mw=126,000 as measured by GPC. The ion-exchange capacity of the polymer was 2.27 meq/g.

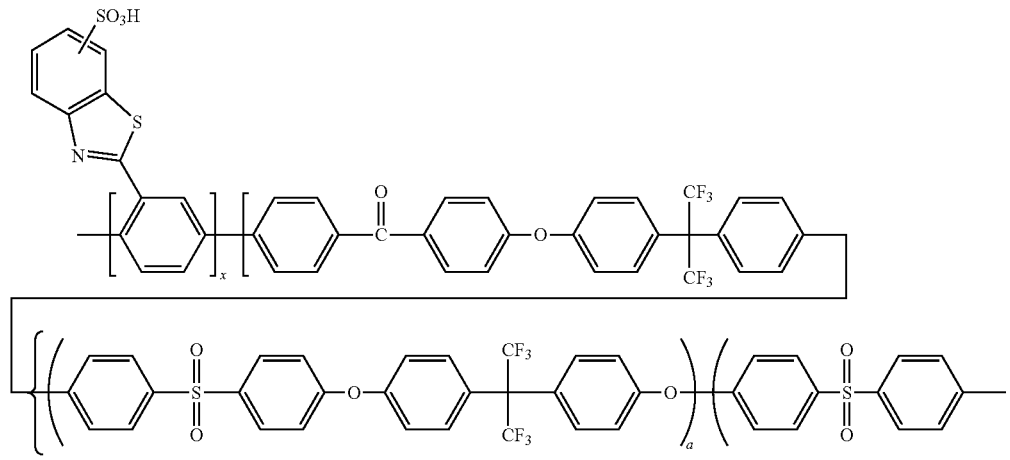

(8-15)

Preparation of Membrane Electrode Assembly

The membrane electrode assembly was obtained in the same manner as Example 1, except that the polymer obtained from Example 8 was applied.

Example 9

In synthesis of the polymer in Example 4, a polymer expressed by the formula (8-16) was synthesized in the same manner, except that the formula (8-1) was changed into the formula (8-12). The resulting polymer had a molecular weight of Mn=37,000 and Mw=102,000 as measured by GPC. The ion exchange capacity was 2.26 meq/g.

Preparation of Membrane Electrode Assembly

The membrane electrode assembly was obtained in the same manner as Example 1, except that the polymers obtained from Example 9 was applied.

Example 10

In synthesis of the polymer in Example 5, a polymer expressed by the formula (8-17) was synthesized in the same manner, except that the formula (8-1) was changed into the formula (8-12). The resulting polymer had a molecular weight of Mn=45000 and Mw=128,000 as measured by GPC. The ion-exchange capacity of the polymer was 2.27 meq/g.

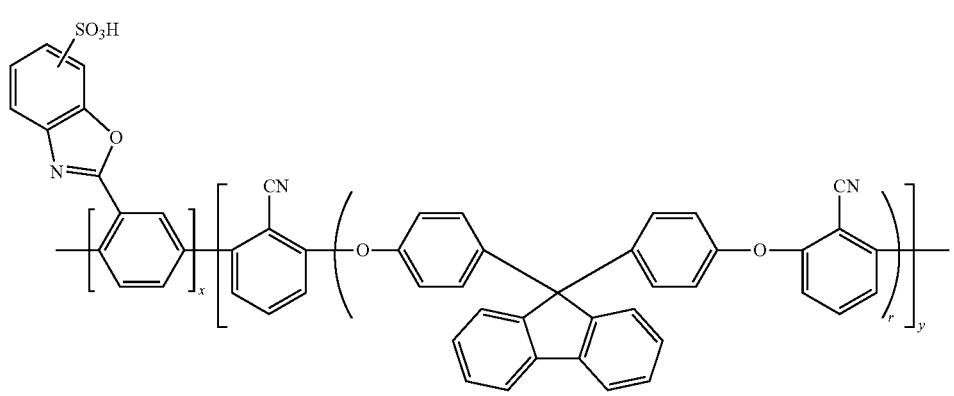

(8-16)

(8-17)

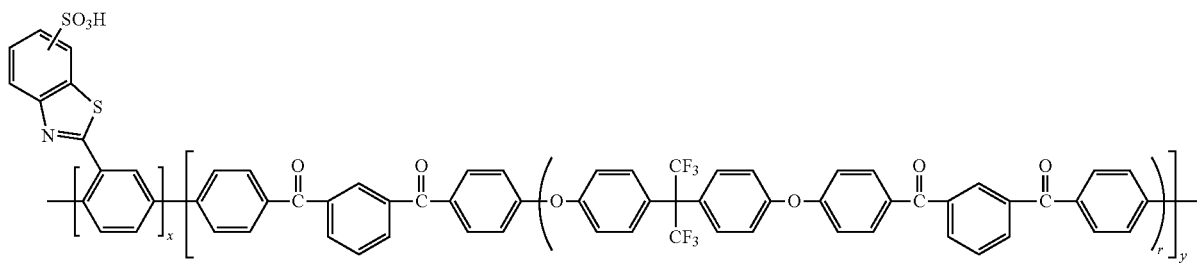

Preparation of Membrane Electrode Assembly

The membrane electrode assembly was obtained in the same manner as Example 1, except that the polymer obtained from Examples 10 was applied.

Comparative Example 1

119 g (296 mmol) of 3-(2,5-dichlorobenzoyl)benzenesulfonic acid neopentyl, 30.4 g (3.9 mmol) of the hydrophobic unit expressed by the formula (6-6), 5.89 g (9.0 mmol) of bis(triphenylphosphine) nickel dichloride, 1.35 g (9 mmol) of sodium iodide, 31.5 g (120 mmol) of triphenylphosphine, and 47.1 g (720 mmol) of zinc were added into a 1 L three-necked flask equipped with a stirrer, thermometer and nitrogen inlet tube, and then purging with dry nitrogen gas. 350 mL of N,N-dimethylacetamide (DMAc) was added into the mixture. The reaction mixture was maintained at 80 degrees C. and was stirred successively for 3 hours, and then the reaction mixture was diluted with 700 mL of DMAc, and the insoluble matter was filtered out.

The resulting solution was poured into a 2 L flask, equipped with a stirrer, a thermometer, and a nitrogen inlet tube, and then the content was stirred while heating at 115 degrees C. and 56.6 g (651 mmol) of lithium bromide was added. After stirring for 7 hours, the reaction mixture was poured into 5 L of acetone to thereby precipitate the product. The product was then washed with 1N HCl and pure water, in that order, and was dried to obtain 103 g of desired sulfonated polymer. The weight average molecular weight of the resulting polymer, considered to be the polymer expressed by the formula (8-18), was 165,000. The ion-exchange capacity of the polymer was 2.26 meq/g.

(8-18)

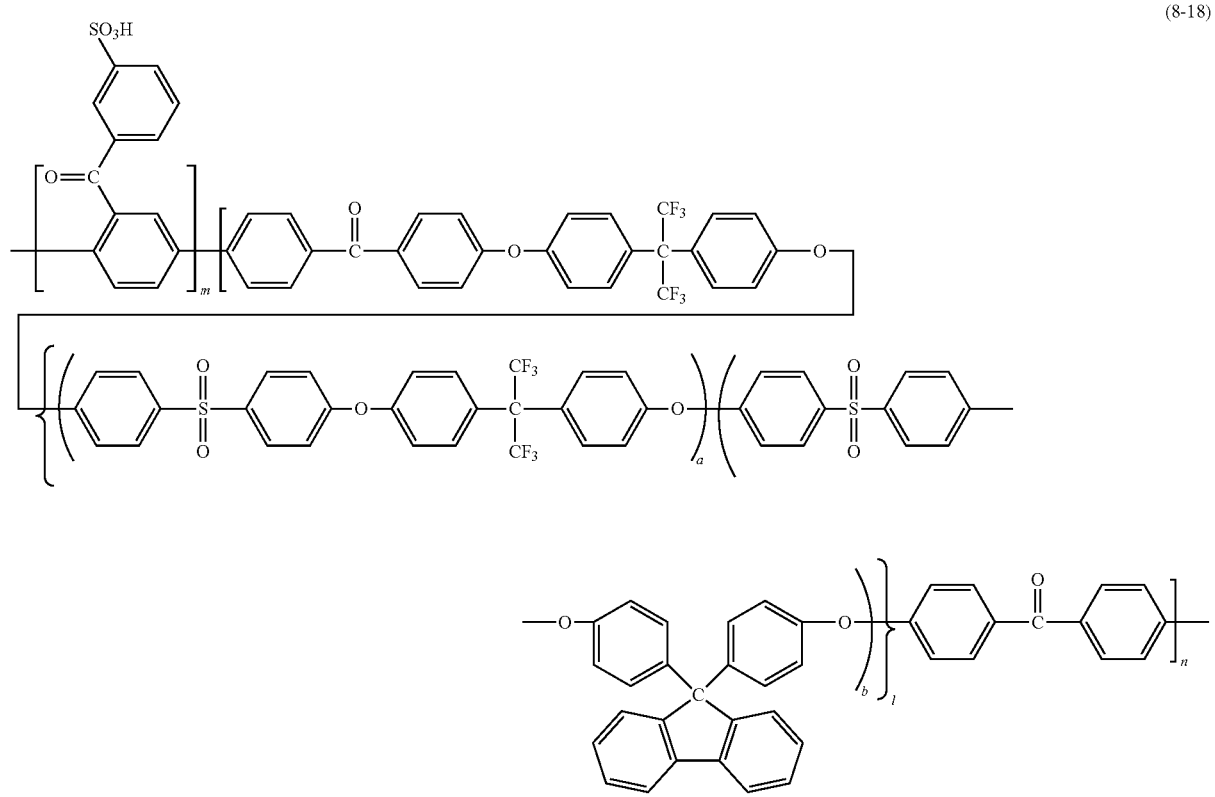

Preparation of Membrane Electrode Assembly

The membrane electrode assembly was obtained in the same manner as Example 1, except that the polymers obtained from Comparative Example 1 were applied.

Evaluation of Power Generating Property

The membrane electrode assembly obtained in each of Examples 1 to 10 and Comparative Example 1 was evaluated with respect to power generating properties, under conditions in which the temperature was 70 degrees C., relative humidity was 40%/24% at both the fuel electrode side and the oxygen electrode side, and the current density was 1 A/cm². Pure hydrogen was supplied to the fuel electrode side, and air was supplied to the oxygen electrode side. The durability was evaluated under the power generating conditions in which the cell temperature was 120 degrees C., the current density was 0.1 A/cm², and the relative humidity was 35% at both the fuel electrode side and the oxygen electrode side, and the period up to cross-leak was reported. Durable generating periods of 300 hours or more were considered to be "satisfactory", while periods of less than 300 hours was considered to be "unsatisfactory". The results are summarized in Table 1.

TABLE 1

| | Polymer Physical Property | | | Mechanical Property | | | Proton | Heat Test | | Power Generating Characteristics | |
|---|---|---|---|---|---|---|---|---|---|---|---|
| | Mn | Mw | Sulfonic Acid Equivalent meq/g | Tensile Strength MPa | Elongation % | Elastic Modulus GPa | Conductivity S/cm | Molecular Weight | Insoluble Matter % | Power Generating Performance V | Power Generating Durability |
| Example 1 | 47000 | 145000 | 2.25 | 120 | 38 | 4.1 | 0.29 | Unchanged | 0 | 0.642 | Satisfactory |
| Example 2 | 38000 | 104000 | 2.31 | 124 | 40 | 4.2 | 0.33 | Unchanged | 0 | 0.656 | Satisfactory |
| Example 3 | 45000 | 135000 | 2.28 | 134 | 36 | 3.9 | 0.31 | Unchanged | 0 | 0.653 | Satisfactory |
| Example 4 | 41000 | 123000 | 2.27 | 142 | 41 | 3.8 | 0.30 | Unchanged | 0 | 0.651 | Satisfactory |
| Example 5 | 49000 | 152000 | 2.28 | 130 | 37 | 4.0 | 0.31 | Unchanged | 0 | 0.652 | Satisfactory |
| Example 6 | 46000 | 139000 | 2.26 | 136 | 35 | 3.9 | 0.29 | Unchanged | 0 | 0.641 | Satisfactory |
| Example 7 | 35000 | 110000 | 2.29 | 140 | 42 | 3.5 | 0.31 | Unchanged | 0 | 0.650 | Satisfactory |
| Example 8 | 40000 | 126000 | 2.27 | 126 | 37 | 3.3 | 0.30 | Unchanged | 0 | 0.649 | Satisfactory |
| Example 9 | 37000 | 102000 | 2.26 | 146 | 40 | 3.7 | 0.29 | Unchanged | 0 | 0.646 | Satisfactory |
| Example 10 | 45000 | 128000 | 2.27 | 137 | 36 | 3.8 | 0.29 | Unchanged | 0 | 0.643 | Satisfactory |
| Comparative Example 1 | 57000 | 165000 | 2.26 | 110 | 40 | 2.8 | 0.30 | Changed | 80 | 0.649 | Unsatisfactory |

The results of Table 1 show that the sulfonated polyarylene of the present invention has superior mechanical characteristics and proton conductivity. In addition, the polyarylene regulates changes in molecular weight and the generation of insoluble matter, which deteriorates mechanical characteristics and proton conductivity, so as to exhibit superior heat resistance. Furthermore, it is obvious that the conjunction of membranes and electrodes using the sulfonated polyarylene of the present invention has superior power generating performance and power generating durability at high temperatures.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A membrane electrode assembly for solid polymer electrolyte fuel cells, comprising: an anode electrode, a cathode electrode, and a solid polymer electrolyte membrane, the anode electrode and the cathode electrode are disposed on opposite sides of the solid polymer electrolyte membrane, wherein the solid polymer electrolyte membrane has a nitrogen atom and a sulfonic acid group, and a constitutional unit in which a principal chain is a phenylene bond, wherein the solid polymer electrolyte membrane includes a sulfonated polyarylene having a constitutional unit expressed by the general formula (1) below:

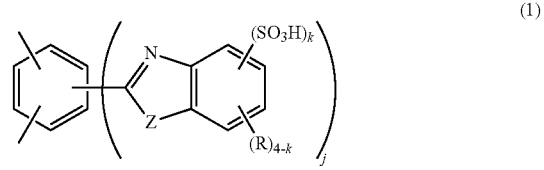

in which, Z represents a sulfur atom, oxygen atom, and —NH— group; R represents at least one atom or group selected from a hydrogen atom, fluorine atom, alkyl group, partly or fully halogenated alkyl group, allyl group, aryl group, nitro group and nitrile group, which may be identical or different from each other; and j and k are integers of 1 to 4 and wherein the solid polymer electrolyte membrane includes a sulfonated polyarylene further having a constitutional unit expressed by the general formula (2):

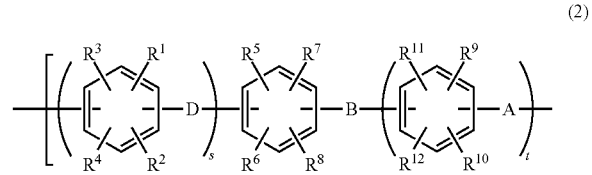

-continued

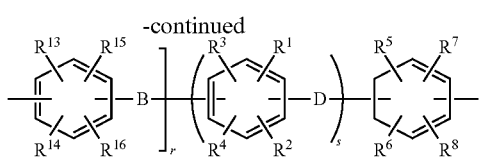

in which A and D each represent at least one structure selected independently from the group consisting of: a direct bond, —CO—, —SO$_2$—, —SO—, —CONH—, —COO—, —(CF$_2$)$_l$— (l is an integer of 1 to 10), —(CH$_2$)$_l$— (l is an integer of 1 to 10), —CR'$_2$— (R' is an aliphatic hydrocarbon group, aromatic hydrocarbon group, halogenated hydrocarbon group) cyclohexylidene group, fluorenylidene group, —O—, or —S—; B is independently an oxygen or sulfur atom; R$^1$ to R$^{16}$, which may be identical or different from each other, represent at least one atom or group selected from a hydrogen atom, fluorine atom, alkyl group, partly or fully halogenated alkyl group, allyl group, aryl group, nitro group and nitrile group; s and t are integers of 0 to 4; and r is an integer of 0 or more than 1.

2. The membrane electrode assembly for solid polymer electrolyte fuel cells according to claim 1, wherein the sulfonated polyarylene contains 0.5 to 99.999 mol % of the constitutional unit expressed by the general formula (1), and 0.001 to 90 mol % of the constitutional unit expressed the general formula (2).

3. The membrane electrode assembly for solid polymer electrolyte fuel cells according to claim 1, wherein the sulfonated polyarylene has an ion exchange capacity of 0.5 to 3 meq/g.

4. The membrane electrode assembly for solid polymer electrolyte fuel cells according to claim 1, wherein the sulfonated polyarylene has a weight average molecular weight of 10,000 to 1,000,000.

* * * * *